(12) United States Patent
Schickling et al.

(10) Patent No.: US 12,715,611 B2
(45) Date of Patent: Aug. 25, 2026

(54) OFFLINE INTELLIGENCE ADVANCED DRIVER ASSISTANCE SYSTEM FOR AIRCRAFT TOWING

(71) Applicant: TowFLEXX MilTech, Inc., New Castle, DE (US)

(72) Inventors: Axel Schickling, Visbek (DE); Tobias Strobl, Las Vegas, NV (US); Reuben Brasher, Daly City, CA (US)

(73) Assignee: TowFLEXX MilTech, Inc., New Castle, DE (US)

( * ) Notice: Subject to any disclaimer, the term of this patent is extended or adjusted under 35 U.S.C. 154(b) by 0 days.

(21) Appl. No.: 19/334,616

(22) Filed: Sep. 19, 2025

(65) Prior Publication Data

US 2026/0109478 A1 Apr. 23, 2026

Related U.S. Application Data

(63) Continuation-in-part of application No. 19/072,829, filed on Mar. 6, 2025, now Pat. No. 12,545,434, (Continued)

(51) Int. Cl.
*B64F 1/228* (2024.01)
*G05D 1/437* (2024.01)
(Continued)

(52) U.S. Cl.
CPC ................ *B64F 1/228* (2013.01); *B64F 1/02* (2013.01); *B64F 1/24* (2013.01); *G05D 1/437* (2024.01)

(58) Field of Classification Search
CPC . B64F 1/225; B64F 1/228; B64F 1/24; B64D 45/06; G05D 1/437
See application file for complete search history.

(56) References Cited

U.S. PATENT DOCUMENTS 4,225,279 A * 9/1980 Boyer ..................... B64F 1/227 414/428
6,739,822 B2 * 5/2004 Johansson ................. B64F 1/22 244/50

(Continued)

FOREIGN PATENT DOCUMENTS

CA 2743957 C 6/2010
CA 2789902 C 8/2011

(Continued)

OTHER PUBLICATIONS

"i-NPS: Intelligent Nosegear Protection System", Mototok; May 13, 2021; https://web.archive.org/web/20210513022500/https://www.mototok.com/solutions/i-nps.

*Primary Examiner* — Brian M O'Hara
(74) *Attorney, Agent, or Firm* — Scale LLP

(57) ABSTRACT

A system for autonomous aircraft towing includes a tow vehicle with a turntable lifting unit for engaging an aircraft's nose landing gear, a sensor system, and an Offline Intelligence Advanced Driver Assistance System (OI-ADAS) integrated with the tow vehicle. The OI-ADAS includes a local processing unit that processes sensor data in volatile memory without persistent storage and a controller that analyzes visual cues to determine position and orientation, generates control commands, controls the turntable lifting unit, and maneuvers the tow vehicle. The OI-ADAS operates without preexisting knowledge of the environment, processing all data exclusively in volatile memory and discarding visual frames after processing. The system detects visual cues on ground surfaces for navigation without relying on pre-existing maps or GPS data. A collision avoidance module detects obstacles and generates avoidance maneuvers in autonomous mode while providing warnings and intervention in operator-controlled mode.

20 Claims, 15 Drawing Sheets

Related U.S. Application Data which is a continuation of application No. 18/920,075, filed on Oct. 18, 2024, now Pat. No. 12,269,612.

(51) Int. Cl.

| | |
|---|---|
| *B64F 1/02* | (2006.01) |
| *B64F 1/24* | (2006.01) |

(56) References Cited

U.S. PATENT DOCUMENTS

| | | | | |
|---|---|---|---|---|
| 8,245,980 | B2 | 8/2012 | Perry et al. | |
| 9,090,358 | B2 | 7/2015 | Perry et al. | |
| 9,199,745 | B2 * | 12/2015 | Braier | B64F 1/227 |
| 9,898,003 | B2 | 2/2018 | Warpinski et al. | |
| 11,858,659 | B2 * | 1/2024 | Vana | B64D 43/00 |
| 12,077,318 | B2 | 9/2024 | Zhang et al. | |
| 12,204,331 | B2 | 1/2025 | Ziv Av et al. | |
| 2019/0202579 | A1 * | 7/2019 | Costello | B64F 1/228 |
| 2023/0303267 | A1 | 9/2023 | Vidal Rojas et al. | |

FOREIGN PATENT DOCUMENTS

| | | | |
|---|---|---|---|
| EP | 1464577 | A1 | 10/2004 |
| EP | 4296170 | A1 | 12/2023 |
| FR | 2774758 | A1 | 8/1999 |
| FR | 2956381 | A1 | 8/2011 |

* cited by examiner

OFFLINE INTELLIGENCE ADVANCED DRIVER ASSISTANCE SYSTEM FOR AIRCRAFT TOWING

CROSS-REFERENCE TO RELATED APPLICATIONS

This application is a continuation-in-part of U.S. application Ser. No. 19/072,829, filed Mar. 6, 2025, which is a continuation of U.S. application Ser. No. 18/920,075, filed Oct. 18, 2024, each of which is hereby incorporated by reference in its entirety.

FIELD OF INVENTION

The present disclosure relates to aircraft ground handling systems, and more particularly to an autonomous system for capturing, lifting, and pushing back aircraft using a tow vehicle with an integrated turntable and sensor array.

BACKGROUND

Aircraft ground handling operations, including towing, pushback, and repositioning, are critical tasks performed at airports and on aircraft carriers. These operations require precise control and maneuvering of aircraft in confined spaces to ensure safety and efficiency. Conventional towing methods often involve the use of towbars, which can be cumbersome to connect and disconnect, and may place stress on the aircraft's landing gear during turns.

Towing vehicles for aircraft have evolved to include towbarless designs that directly engage the nose landing gear. These vehicles typically have a rotating platform or turntable to allow the aircraft to be turned while towing. However, existing systems may still face challenges in maintaining proper alignment between the tow vehicle and the aircraft, particularly during tight maneuvers or in adverse weather conditions.

The increasing size and complexity of modern aircraft, combined with the need for more efficient ground operations, has created a demand for more advanced and autonomous towing solutions. There is a particular need for systems that can reduce the risk of damage to aircraft, improve operational efficiency, and minimize the personnel required for ground handling tasks.

Additionally, as airports and aircraft carriers become more congested, there is a growing need for tow vehicles that can operate in tighter spaces and perform more precise maneuvers. This includes the ability to reposition aircraft quickly and safely in hangars, on flight decks, and in other confined areas where traditional towing methods may be impractical or inefficient.

Furthermore, the aviation industry is increasingly focused on reducing emissions and improving sustainability in all aspects of operations, including ground handling. This has led to interest in electric and hybrid tow vehicles that can operate with lower environmental impact while still meeting the demanding requirements of aircraft towing and pushback operations.

Conventional aircraft towing vehicles powered by gasoline or diesel engines often suffer from poor fuel efficiency and high operating costs. The complex mechanical systems in these engines require frequent maintenance, including oil changes, filter replacements, and component repairs, leading to increased downtime and expenses. Furthermore, the combustion of fossil fuels produces substantial amounts of harmful emissions, contributing to air quality degradation in airport environments.

Electric propulsion systems have emerged as a promising alternative for aircraft towing vehicles. However, the implementation of electric systems in this application presents unique challenges. Aircraft towing requires high torque and power output, particularly during initial movement and when overcoming the inertia of large aircraft. This demand for high current can strain conventional battery systems and limit operational capabilities.

Additionally, the operational requirements of airports necessitate minimal downtime for charging or maintenance. Towing vehicles must be available for extended periods to support continuous airport operations, which can be challenging for electric vehicles with limited battery capacity or long charging times.

The development of advanced battery management systems is critical to addressing these challenges. Such systems must be capable of delivering high currents for breakaway torque while maintaining efficiency and longevity. Furthermore, they should offer flexibility in terms of capacity and power output to accommodate various aircraft sizes and operational needs.

As the aviation industry continues to evolve, there is an increasing demand for innovative solutions that can enhance the efficiency, sustainability, and reliability of ground support equipment. Improved battery management systems for aircraft towing vehicles have the potential to significantly impact airport operations, reducing costs, minimizing environmental impact, and improving overall operational efficiency.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a system for autonomous aircraft towing is provided. The system comprises a tow vehicle including a turntable lifting unit configured to engage with an aircraft's nose landing gear. The system comprises a sensor system mounted on the tow vehicle, the sensor system including at least one camera. The system comprises an Offline Intelligence Advanced Driver Assistance System (OI-ADAS) integrated with the tow vehicle, the OI-ADAS including a local processing unit configured to process sensor data in volatile memory without persistent storage and a controller configured to analyze visual cues from the camera to determine the tow vehicle's position and orientation, generate control commands for the tow vehicle based on the analyzed visual cues, control the turntable lifting unit to capture and lift the aircraft's nose landing gear, and maneuver the tow vehicle to tow the aircraft based on the generated control commands.

According to other aspects of the present disclosure, the system may include one or more of the following features. The OI-ADAS may be configured to operate without preexisting knowledge of the operating environment, wherein the local processing unit processes all sensed data exclusively in volatile memory, and wherein visual frames captured by the camera are discarded immediately after processing. The controller may be further configured to detect visual cues on a ground surface and navigate the tow vehicle based on the detected visual cues without relying on pre-existing maps or GPS data. The visual cues may include at least one of pushback lines, taxiway centerlines, or parking position indicators. The OI-ADAS may further comprise a collision avoidance module configured to detect obstacles in the tow vehicle's path using the sensor system, generate avoidance maneuvers in a fully autonomous mode by automatically adjusting the tow vehicle's trajectory to maintain safe distances from detected obstacles, and provide collision warnings and automatic intervention in an operator-controlled mode when potential collision risks are detected. The collision avoidance module may be further configured to monitor operator inputs during operator-controlled mode, detect intervention conditions including one or more of operator force applied to controls, excessive deviation from planned paths, and detection of imminent collision risks, and automatically transition between fully autonomous and operator-controlled modes based on the detected intervention conditions while maintaining safety constraints throughout the transition.

The OI-ADAS may further comprise integrated torque sensors at the turntable lifting unit and drive system configured to detect force feedback indicating resistance or unexpected forces during operation independently of visual sensor data and automatically initiate corrective responses including adjusting operation parameters or initiating emergency stopping procedures to maintain stability of the tow vehicle and aircraft. The integrated torque sensors may be further configured to monitor forces applied to the aircraft's nose landing gear during lifting and towing operations, detect abnormal force patterns indicating potential mechanical stress or misalignment, and generate autonomous responses by automatically reducing applied forces or halting operations when force thresholds are exceeded to prevent damage to the aircraft or tow vehicle. The OI-ADAS may further comprise a short-term path estimation module configured to predict the tow vehicle's trajectory based on current sensor data and control inputs. The sensor system may further include at least one of a gravitometer, an accelerometer, a gyroscope, and a magnetometer, and wherein the controller is further configured to fuse data from the camera and at least one of the gravitometer, accelerometer, gyroscope, or magnetometer to estimate the tow vehicle's pose.

According to another aspect of the present disclosure, a method for autonomous aircraft towing is provided. The method comprises engaging an aircraft's nose landing gear with a turntable lifting unit of a tow vehicle. The method comprises capturing sensor data from a sensor system mounted on the tow vehicle, the sensor system including at least one camera. The method comprises processing the sensor data in volatile memory without persistent storage using a local processing unit of an Offline Intelligence Advanced Driver Assistance System (OI-ADAS) integrated with the tow vehicle. The method comprises analyzing visual cues from the camera to determine the tow vehicle's position and orientation. The method comprises generating control commands for the tow vehicle based on the analyzed visual cues. The method comprises controlling the turntable lifting unit to capture and lift the aircraft's nose landing gear. The method comprises maneuvering the tow vehicle to tow the aircraft based on the generated control commands.

According to other aspects of the present disclosure, the method may include one or more of the following features. The OI-ADAS may operate without preexisting knowledge of the operating environment, wherein processing the sensor data comprises processing all sensed data exclusively in volatile memory, and wherein the method further comprises discarding visual frames captured by the camera immediately after processing. The method may further comprise detecting visual cues on a ground surface and navigating the tow vehicle based on the detected visual cues without relying on pre-existing maps or GPS data. The visual cues may include at least one of pushback lines, taxiway centerlines, or parking position indicators. The method may further comprise detecting obstacles in the tow vehicle's path using the sensor system, generating avoidance maneuvers in a fully autonomous mode by automatically adjusting the tow vehicle's trajectory to maintain safe distances from detected obstacles, and providing collision warnings and automatic intervention in an operator-controlled mode when potential collision risks are detected. The method may further comprise monitoring operator inputs during operator-controlled mode, detecting intervention conditions including one or more of operator force applied to controls, excessive deviation from planned paths, and detection of imminent collision risks, and automatically transitioning between fully autonomous and operator-controlled modes based on the detected intervention conditions while maintaining safety constraints throughout the transition.

The method may further comprise detecting force feedback indicating resistance or unexpected forces during operation independently of visual sensor data using integrated torque sensors at the turntable lifting unit and drive system and automatically initiating corrective responses including adjusting operation parameters or initiating emergency stopping procedures to maintain stability of the tow vehicle and aircraft. The method may further comprise monitoring forces applied to the aircraft's nose landing gear during lifting and towing operations, detecting abnormal force patterns indicating potential mechanical stress or misalignment, and generating autonomous responses by automatically reducing applied forces or halting operations when force thresholds are exceeded to prevent damage to the aircraft or tow vehicle. The method may further comprise predicting the tow vehicle's trajectory based on current sensor data and control inputs using a short-term path estimation module. The sensor system may further include at least one of a gravitometer, an accelerometer, a gyroscope, and a magnetometer, and wherein the method further comprises fusing data from the camera and at least one of the accelerometer, gyroscope, or magnetometer to estimate the tow vehicle's pose.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

The present disclosure provides an autonomous system for capturing, lifting, and pushing back aircraft using a tow vehicle equipped with an integrated turntable lifting unit, sensor fusion system, and controller. This system is designed to enhance the efficiency and precision of aircraft ground handling operations, reducing the risk of damage to aircraft and minimizing the need for manual labor.

The automated 360° turntable lifting unit is a key component of the system, designed to rotate and lift for attachment to a wide range of single and double nose-wheel aircraft configurations. This unit allows the tow vehicle to attach to the aircraft's nose landing gear (NLG) directly from any side of the aircraft, eliminating the need for an exit route and increasing the utilization of space.

The sensor fusion system, integrated with the turntable lifting unit, comprises multiple sensor technologies, such as high-resolution camera sensors, ultrasonic sensors, radar sensors, and laser sensors. These sensors work in unison to detect the NLG and guide the tow vehicle during operations. In some embodiments, the sensor fusion system can also detect pushback lines and other markings on the ground or tarmac, human gestures, environmental conditions, and obstacles, facilitating autonomous pushback operations.

The controller processes data from the sensor fusion system and controls the turntable lifting unit to automatically adjust the position of the tow vehicle relative to the NLG. In some embodiments, the controller includes an artificial intelligence/machine learning component trained on real-world conditions to facilitate autonomous decision-making during pushback operations.

Together, these components form a comprehensive system for autonomous aircraft capturing, lifting, and pushback, offering significant improvements over conventional aircraft ground handling methods.

Figure 1A:
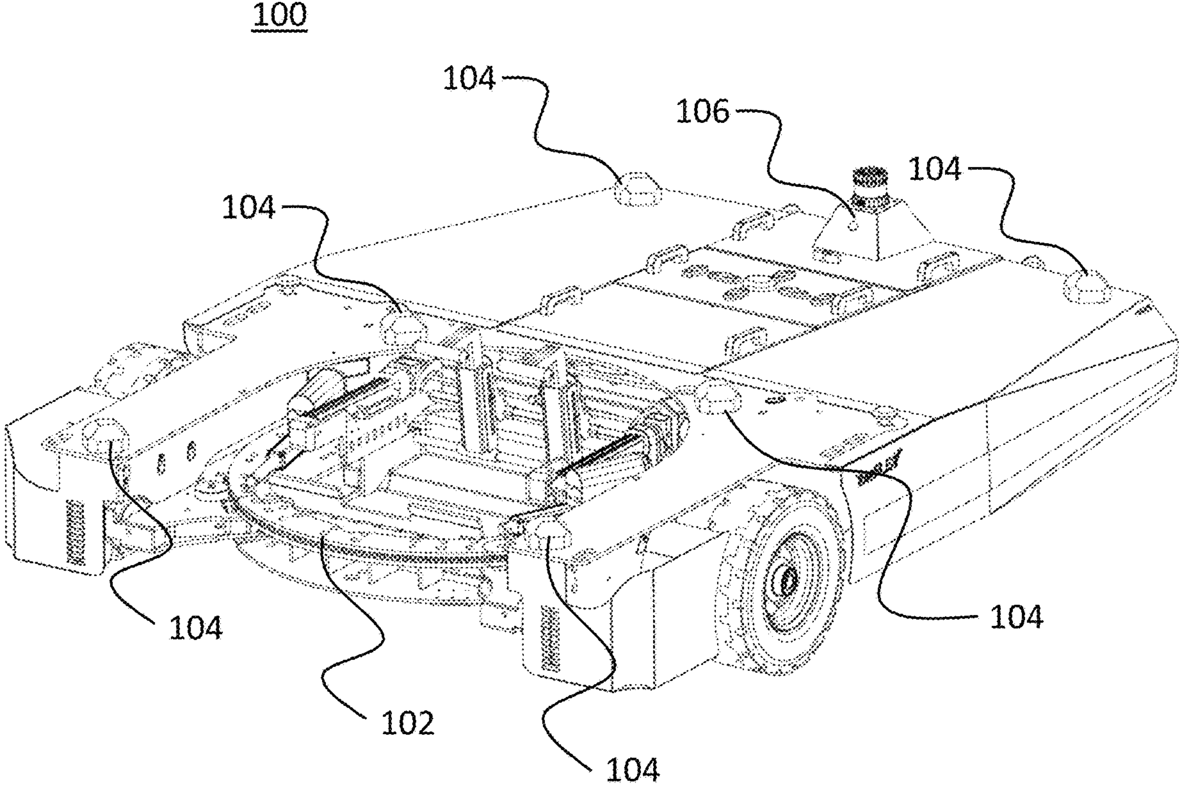
FIG. 1A illustrates a perspective view of a tow vehicle, according to aspects of the present disclosure.

Referring to FIG. 1A, the tow vehicle 100 is depicted in a perspective view. The tow vehicle 100 has a main body with a generally rectangular shape and rounded corners. This design may provide stability and maneuverability during operations. The body of the tow vehicle 100 includes a central opening or cavity in its upper surface. This cavity may house internal mechanisms or components, such as the turntable lifting unit, sensor system, and controller, which contribute to the functionality of the tow vehicle 100.

The tow vehicle 100 incorporates multiple sensors 104 and sensors 106 positioned at various points around its body. In some aspects, these sensors 104 and 106 may be used for environmental awareness and navigation. For example, sensors 104 may be used to sense and monitor the NLG, the positioning of the tow vehicle 100 relative to the aircraft, and/or the presence of obstacles or hazards around the aircraft. In some cases, sensors 106 may be used to detect pushback lines and other markings on the ground or tarmac, human gestures, environmental conditions, and/or obstacles, such as other aircraft, to facilitate autonomous pushback operations.

In some aspects, the tow vehicle 100 may be manually controlled by a human operator through wired or wireless means, allowing for direct control of its movements and functions. This manual control mode may be useful in situations that require human judgment or in environments where autonomous operation is not feasible or desired.

In other embodiments, the tow vehicle 100 may operate in a semi-autonomous mode. In this mode, the system may require only minimal input from a human operator to initiate operations and provide high-level instructions. For example, an operator may input a destination or a specific task, and the tow vehicle 100 may then autonomously execute the necessary movements and actions to complete the task, while still allowing for human oversight and intervention if needed.

In still other embodiments, the tow vehicle 100 may be capable of fully autonomous operation. In this mode, the vehicle may perform complex aircraft handling tasks, including capturing, lifting, and pushing back aircraft, without direct human control. The autonomous mode may utilize the sensor fusion system, controller, and other integrated components to navigate the airport environment, make decisions, and execute operations based on pre-programmed algorithms and real-time data analysis.

Figure 1B:
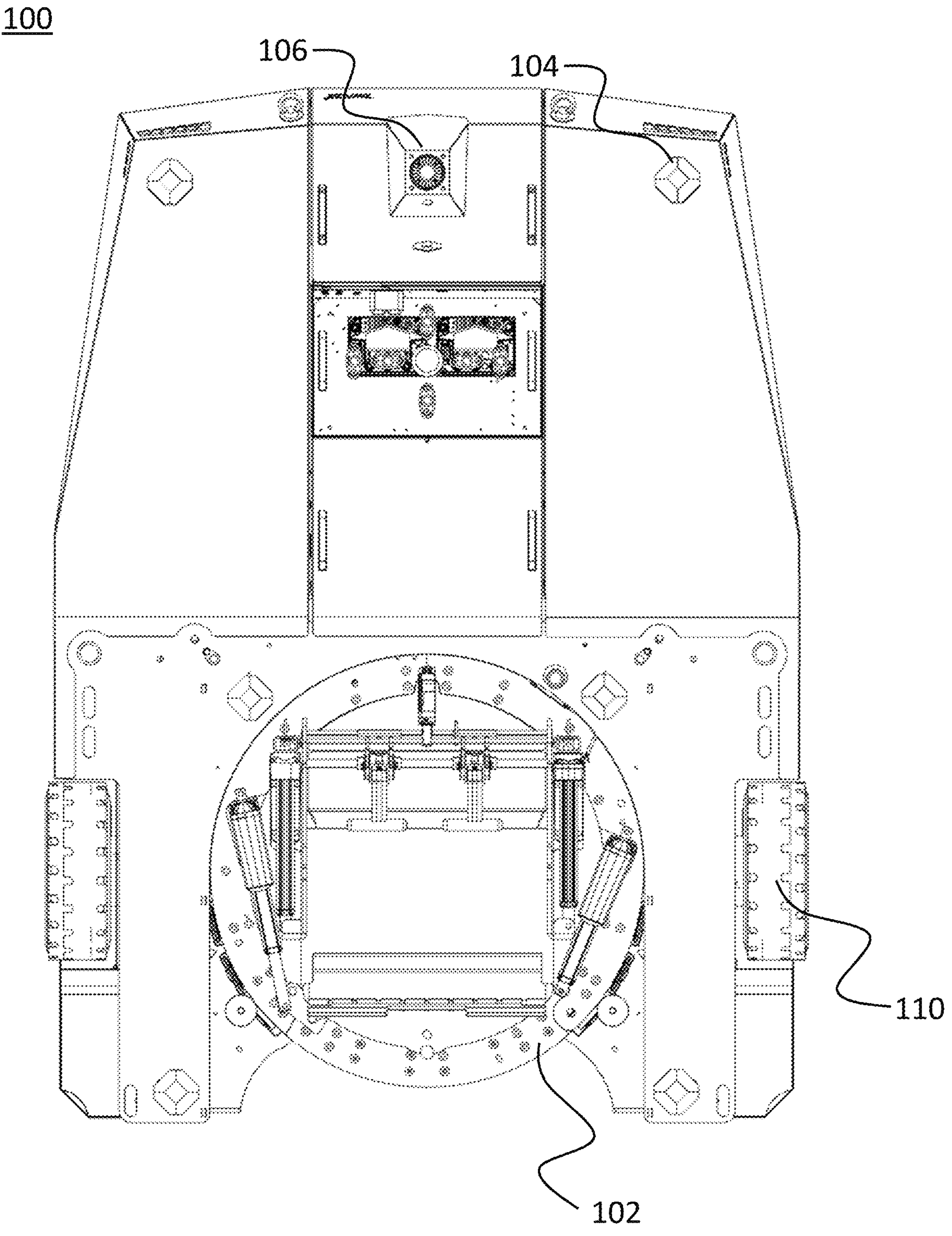
FIG. 1B illustrates a top view of the tow vehicle of FIG. 1A.

Referring to FIG. 1B, the tow vehicle 100 is depicted in a top view, providing a clear view of the sensor system. The sensor system comprises multiple sensors 104 and sensors 106, which may be strategically positioned around the tow vehicle 100. This positioning may allow for comprehensive environmental awareness and navigation during operations. The sensor system of the tow vehicle 100 can be configured to detect a type of aircraft and/or the nose landing gear (NLG) of an aircraft. This detection capability supports the autonomous capturing and lifting process, as it enables the tow vehicle 100 to accurately locate and secure the NLG.

The sensor system comprises at least one of a camera sensor, an ultrasonic sensor, a radar sensor, or a laser sensor. These different types of sensors may work in unison to provide a comprehensive sensing capability. For example, camera sensors may capture high-resolution images of the aircraft, its NLG, and the surrounding environment, while ultrasonic sensors may measure the distance between the tow vehicle 100 and the NLG. Radar sensors may detect the presence of obstacles or hazards around the aircraft, and laser sensors may provide precise measurements of the NLG dimensions. In some embodiments, the sensor system may include additional sensors or different types of sensors, depending on the specific requirements of the aircraft capturing and lifting process.

The data collected by the sensor system is processed by a controller of the tow vehicle 100. The controller determines the position of the aircraft and its NLG based on the sensor data and controls the turntable lifting unit to automatically adjust the position of the tow vehicle 100 relative to the NLG. This autonomous adjustment capability allows the tow vehicle 100 to accurately align with the NLG, facilitating the capturing and lifting process.

In some aspects, the controller of the tow vehicle may be embodied as a combination of hardware and software components integrated within the tow vehicle's systems. The controller may include a central processing unit (CPU) or microprocessor, memory modules, and various input/output interfaces. The software component may comprise firmware, operating systems, and application-specific programs designed to process sensor data, make decisions, and control the tow vehicle's operations.

The controller may be connected to the Controller Area Network (CAN) bus system of the tow vehicle. This connection may allow the controller to communicate with and control various components of the tow vehicle, including the turntable lifting unit, drive systems, and sensor arrays. The CAN bus may facilitate real-time data exchange between different modules of the tow vehicle, enabling coordinated and efficient operation of all systems.

In some implementations, the controller may interface with one or more additional communication devices to enhance its connectivity and functionality. These communication devices may include wireless modules supporting various protocols such as Wi-Fi, cellular networks, or radio frequency (RF) communication. For example, a Wi-Fi module may allow the controller to connect to local networks at airports or maintenance facilities, potentially enabling remote monitoring and control of the tow vehicle. A cellular modem may provide wide-area network connectivity, allowing the controller to receive updates, transmit operational data, or communicate with remote operators over long distances. RF communication modules may enable short-range, low-latency communication with other ground support equipment or control towers.

The integration of these wireless communication capabilities may allow the controller to receive real-time instructions, update its operational parameters, or transmit status information to remote monitoring systems. In some cases, this may enable remote operation or supervision of the tow vehicle, enhancing its flexibility and utility in various airport environments.

In some embodiments, sensors 106 may be configured as 360-degree sensors, providing a complete view of the surrounding environment. This capability may be particularly useful during pushback operations, where the tow vehicle 100 needs to navigate through complex airport environments. The 360-degree sensors may detect pushback lines, other markings on the ground or tarmac, human gestures, environmental conditions, and obstacles, such as other aircraft.

In some implementations, the 360-degree sensors may utilize Light Detection and Ranging (LiDAR) technology. A LiDAR sensor may emit laser pulses in a 360-degree horizontal plane around the tow vehicle, measuring the time it takes for the pulses to reflect off surrounding objects and return to the sensor. This may allow the sensor to create a detailed 3D map of the environment in real-time.

The LiDAR sensor may be mounted on top of the tow vehicle, potentially providing an unobstructed view of the surroundings. It may rotate rapidly, sending out thousands of laser pulses per second to build a comprehensive point cloud of the area. This point cloud data may be processed by the controller to identify objects, determine their distance and position relative to the tow vehicle, and detect potential obstacles or hazards.

In some aspects, the 360-degree LiDAR sensor may work in conjunction with other sensor types to enhance the overall sensing capabilities of the tow vehicle. For example, the LiDAR data may be fused with information from cameras or radar sensors to provide a more robust and accurate representation of the environment. This sensor fusion approach may help overcome limitations of individual sensor types, such as the ability to detect objects in low-light conditions or distinguish between different types of ground markings.

The 360-degree sensor may also incorporate advanced filtering algorithms to differentiate between static and moving objects in the environment. This capability may be particularly useful in busy airport settings, where the tow vehicle needs to navigate around both stationary obstacles and moving vehicles or personnel.

In some implementations, the sensor fusion system may connect to, communicate with, or otherwise integrate with external sensor systems at the airport or on the aircraft carrier. These external sensor systems may include camera systems, LiDAR sensors, GPS tracking systems, or other systems for monitoring the position and movement of objects in the surrounding environment. The sensor fusion system may leverage information gleaned from these other systems and/or coordinate with them directly for obstacle avoidance, safety compliance, autonomous decision making, operations management, and the like.

External sensor systems may be implemented at fixed locations such as on towers, buildings, or runways. For example, high-resolution cameras mounted on airport terminals may provide a wide-angle view of the tarmac, allowing for real-time tracking of multiple aircraft and ground vehicles simultaneously. LiDAR sensors installed along taxiways may create detailed 3D maps of the area, helping to identify potential obstacles or changes in the environment.

In some aspects, external sensor systems may also be implemented on mobile platforms. Tow vehicles 100 equipped with the sensor fusion system may maintain constant communication with each other and/or one or more support vehicles. These support vehicles may take the form of autonomous or semi-autonomous ground vehicles as well as aircraft like drones.

The ground vehicles or drones may be configured to dock with the tow vehicle 100, and, when needed, separate from the tow vehicle 100 to provide additional monitoring capabilities. These capabilities may be especially advantageous during autonomous pushback operations where the aircraft itself creates certain blind spots for the sensors on the tow vehicle 100. The support vehicles may be configured to cover these blind spots as well as provide an additional layer of visibility to other vehicles and personnel in the vicinity.

In some implementations, support vehicles may be equipped with flashing lights or other visual indicators to enhance their visibility. This feature may help alert other ground personnel or vehicles to the presence of the tow vehicle 100 and its one or more support units, thereby improving overall safety in busy airport environments.

The integration of external sensor systems with the tow vehicle's sensor fusion system may allow for a more comprehensive and accurate understanding of the operational environment. For instance, data from fixed cameras on airport buildings may be combined with real-time information from the tow vehicle's onboard sensors and mobile support units to create a multi-layered, dynamic representation of the surroundings. This enhanced situational awareness may enable more efficient and safer autonomous operations.

In some cases, the communication between the tow vehicle and external sensor systems may be facilitated through a centralized control system. This system may act as a hub, collecting and processing data from various sources and distributing relevant information to individual tow vehicles as needed. Such a setup may allow for coordinated movements of multiple tow vehicles and support units, optimizing traffic flow and reducing the risk of conflicts or collisions.

The integration with external sensor systems may also enhance the tow vehicle's ability to adapt to changing environmental conditions. For example, in low visibility situations such as fog or heavy rain, the tow vehicle may rely more heavily on data from fixed LiDAR sensors or radar systems to supplement its own sensor capabilities. This adaptability may allow for continued safe operation in a wider range of weather conditions.

Continuing with the description of FIG. 1B, the tow vehicle 100 includes a turntable lifting unit (TLU) 102 positioned centrally within its body. In some aspects, the TLU 102 is configured to automatically rotate and lift for attachment to a wide range of single and double nose-wheel aircraft configurations. This allows the tow vehicle 100 to attach to the aircraft's NLG directly from any side of the aircraft, eliminating the need for an exit route and increasing the utilization of space. The TLU 102 is described in more detail with respect to TLU 200 in FIGS. 2A, 2B, and 2C.

The tow vehicle 100 may also include a visual line guidance and object recognition system. This system may be configured to detect line markings, objects, or symbols and control the tow vehicle 100 in response. For example, the visual line guidance and object recognition system may detect pushback lines on the ground or tarmac, facilitating autonomous pushback operations. In some cases, the visual line guidance and object recognition system may also detect human gestures, such as hand signals, and control the tow vehicle 100 accordingly.

Figure 1C:
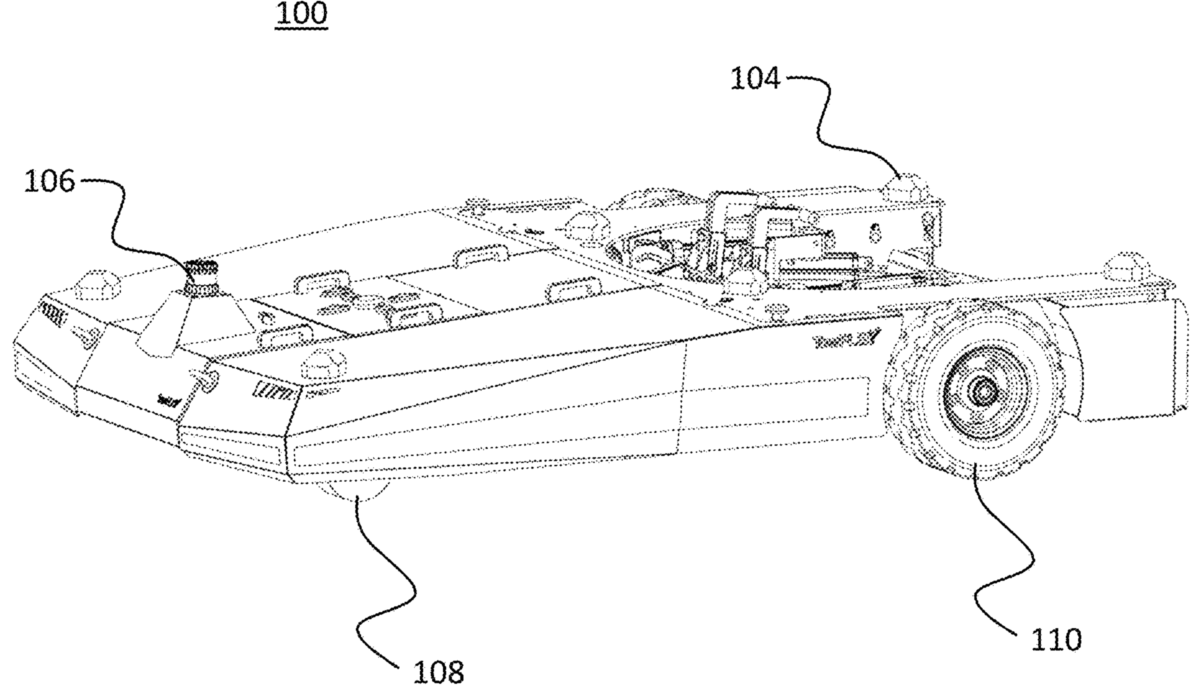
FIG. 1C illustrates a side view of the tow vehicle of FIG. 1A.

Referring to FIG. 1C, the tow vehicle 100 is depicted in a side view, providing a clear view of its overall shape and key components. The tow vehicle 100 has a low-profile, elongated body with a tapered front end and a more elevated rear section. The tow vehicle 100 may be configured with two types of wheels for movement. Caster wheels 108 provide maneuverability for steering. The caster wheels 108 may rotate freely in multiple directions, similar to wheels on a shopping cart, allowing for enhanced maneuverability of the tow vehicle 100. In some aspects, these caster wheels 108 may be equipped with a magnetic brake system that operates in the direction of rotation, which corresponds to the direction of vehicle travel.

The magnetic brake system may include electromagnetic components that, when activated, generate a magnetic field to apply braking force to the caster wheels 108. This braking mechanism may be particularly useful in emergency stop situations. In the event that an emergency stop is initiated, the magnetic brakes on the caster wheels 108 may activate to prevent the tow vehicle 100 from turning sideways too quickly if one side of the drive wheels 110 starts to slip.

By applying braking force in the direction of rotation, the magnetic brake system may help maintain the stability and control of the tow vehicle 100 during rapid deceleration. This feature may enhance the safety of the towing operation by reducing the risk of the tow vehicle 100 skidding or jackknifing during emergency stops or on slippery surfaces. The controller of the tow vehicle 100 may be configured to activate the magnetic brakes on the caster wheels 108 in coordination with the braking of the drive wheels 110. This coordinated braking approach may help ensure a more controlled and stable stop, even in challenging conditions or emergency situations.

Drive wheels 110 can be a part of a drive wheel system and may serve as the main propulsion and steering mechanism for tow vehicle 100. The drive wheel system of the tow vehicle 100 may incorporate two individual drive units, each containing a redundant drive system with twin electrical high-torque rotary drive hub gear motors. These drive units may be positioned on opposite sides of the vehicle, with each unit controlling one of the drive wheels 110. This configuration may allow for independent control of each side of the tow vehicle 100, enabling precise maneuvering and rotation capabilities.

In some aspects, the drive wheel system may be designed to allow the two drive units of the tow vehicle 100 to operate independently. This independent operation may be achieved by controlling the rotation direction and speed of each drive wheel 110 separately. For example, to rotate the tow vehicle 100 in place, the controller may command one drive wheel 110 to rotate in a forward direction while simultaneously commanding the opposite drive wheel 110 to rotate in a reverse direction. This opposing rotation of the drive wheels 110 may create a pivoting effect, allowing the tow vehicle 100 to turn on its central axis without forward or backward movement.

The ability to rotate in place may be particularly advantageous in confined spaces such as crowded airport aprons or narrow hangars. This feature may allow the tow vehicle 100 to maneuver efficiently around obstacles and position itself precisely relative to aircraft, potentially improving the overall efficiency of ground handling operations.

In some implementations, the drive wheel system may include variable speed control for each drive wheel 110. This variable speed control may allow for more nuanced movements, such as gradual turns or slight adjustments in position. The controller may adjust the speed of each drive wheel 110 independently based on input from the sensor system, potentially enabling smooth and precise movements during aircraft capturing, lifting, and pushback operations.

The drive wheel system may also incorporate advanced traction control features. In some cases, the controller may monitor the rotation speed of each drive wheel 110 and adjust power delivery to prevent wheel slip. This traction control capability may be particularly useful when operating on wet or slippery surfaces, potentially enhancing the safety and reliability of the tow vehicle 100 in various weather conditions.

In some aspects, the tow vehicle 100 may be configured with two or more drive wheels 110 on each side to enhance traction, stability, and load-bearing capacity. This configuration may distribute the weight of the tow vehicle 100 and the aircraft more evenly across multiple points of contact with the ground.

The multiple drive wheels 110 on each side may be arranged in a tandem configuration, where they are aligned one behind the other. This arrangement may allow the tow vehicle 100 to maintain a relatively narrow profile while still benefiting from increased traction and load distribution. In some implementations, the drive wheels 110 may be mounted on independent suspension systems, enabling them to adapt to uneven surfaces and maintain consistent ground contact.

Each of the drive wheels 110 in this multi-wheel configuration may be powered by its own electric motor, potentially allowing for even more precise control over the tow vehicle's movement. The controller of the tow vehicle 100 may be programmed to coordinate the operation of these multiple drive wheels 110, adjusting the power output to each wheel based on factors such as the weight distribution of the aircraft, the surface conditions, and the desired maneuver.

In some cases, the use of multiple drive wheels 110 on each side may enable the tow vehicle 100 to handle heavier aircraft or operate in more challenging environmental conditions. For example, this configuration may provide better traction on wet or icy surfaces, or when moving aircraft on inclined surfaces such as those found on some aircraft carriers.

The multi-wheel design may also contribute to the redundancy and reliability of the tow vehicle 100. If one drive wheel 110 or its associated motor were to malfunction, the remaining wheels could potentially continue to provide sufficient propulsion and control to complete the aircraft handling operation or move the tow vehicle 100 to a safe location for maintenance.

Figure 2A:
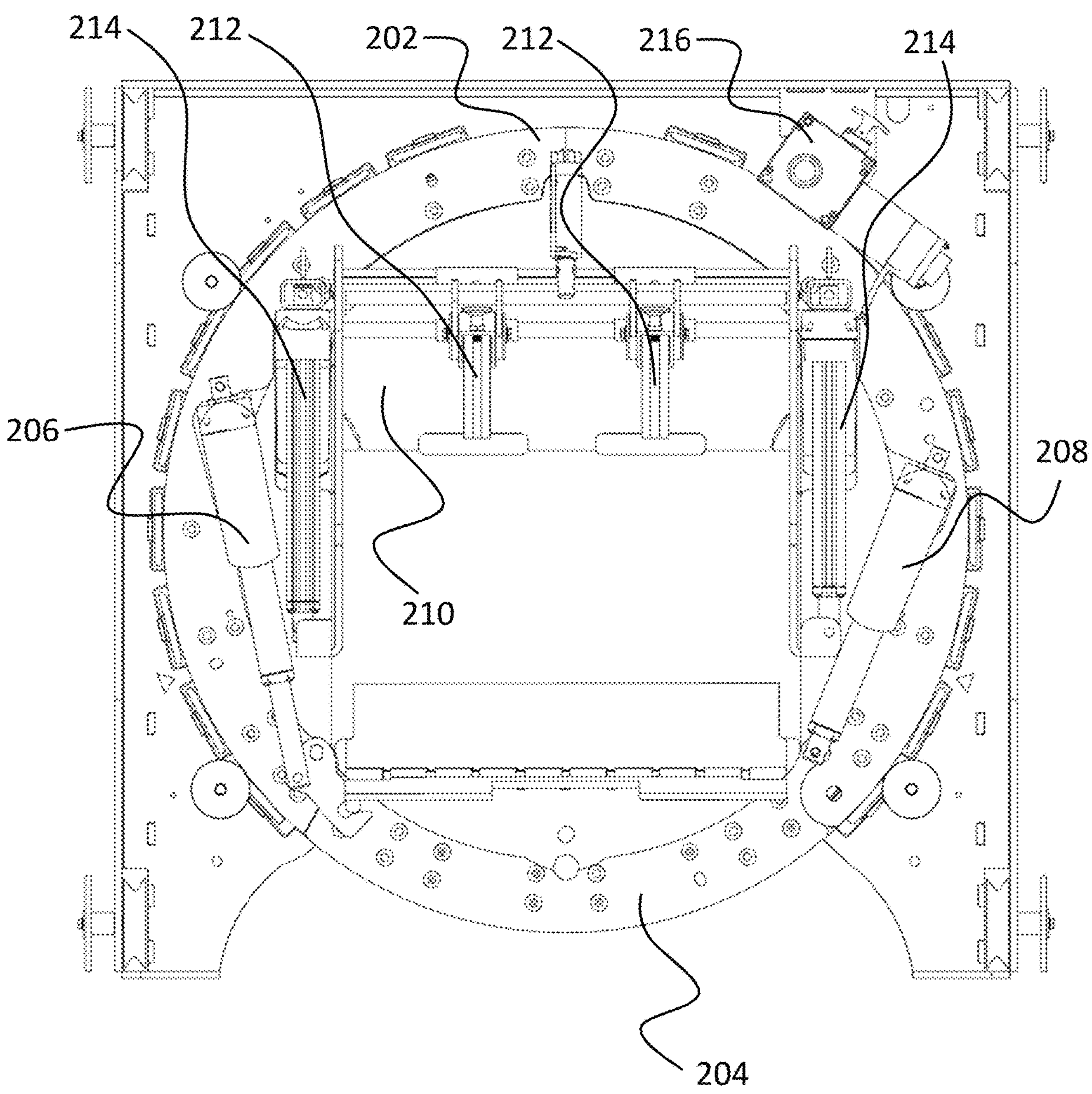
FIG. 2A illustrates a top view of a turntable lifting unit, according to aspects of the present disclosure.

Referring to FIG. 2A, the turntable lifting unit (TLU) 200 is depicted in a top view, providing a clear view of its key components and their functions in capturing, securing, and manipulating the aircraft's NLG. The TLU 200 may be integrated into various configurations to accommodate different operational needs and environments. While the TLU 200 is shown as part of the tow vehicle 100 in FIG. 1A, FIG. 1B, and FIG. 1C, it may also be implemented in other forms.

In some aspects, the TLU 200 may be designed as standalone equipment. This configuration may allow for greater flexibility in deployment and use across different airport or carrier environments. As a standalone unit, the TLU 200 may be equipped with its own power source, sensor system, control systems (including, for example, the controller described above), and mobility features, enabling it to operate independently of a larger vehicle.

In other implementations, the TLU 200 may be combined with or attached to a towbar. This configuration may provide a hybrid solution that leverages the traditional towbar approach while incorporating the advanced capturing and lifting capabilities of the TLU 200. The towbar-TLU combination may offer enhanced maneuverability and precision in aircraft handling, particularly in situations where a full tow vehicle is not required or practical.

Additionally, the TLU 200 may be combined with or attached to different types of vehicles or trailers. This versatility allows for integration with existing ground support equipment or specialized vehicles used in various aviation contexts. For example, the TLU 200 may be mounted on a compact electric vehicle for use in tight hangar spaces, or it may be integrated into a larger, more robust vehicle for outdoor operations in challenging weather conditions.

The sensor system and control mechanisms of the TLU 200 may be adapted to suit each of these configurations. For standalone or towbar-attached implementations, additional sensors or control interfaces may be incorporated to ensure safe and efficient operation without the support of a full tow vehicle. When combined with different vehicles or trailers, the TLU's control systems may be integrated with the host vehicle's systems to provide seamless operation and enhanced functionality.

These various implementations of the TLU 200 may expand its applicability across a wide range of aircraft handling scenarios, from small regional airports to large international hubs, and from traditional ground operations to specialized military applications. The flexibility in configuration may allow operators to select the most appropriate implementation based on their specific needs, infrastructure, and operational constraints.

The automated turntable 202 may form a central part of TLU 200, providing a rotational platform. The automated turntable 202 may be designed to provide precise 360-degree rotation capabilities, allowing for flexible positioning of the aircraft's NLG. This rotational capability may be achieved through the use of a high-precision electric motor coupled with a gear reduction system. The gear reduction system may allow for smooth and controlled rotation, even when under the load of an aircraft.

In some implementations, the automated turntable 202 may utilize a large diameter bearing to support the rotational movement. This bearing may be designed to handle both the vertical loads from the aircraft's weight and the horizontal loads that may occur during towing operations. The outer race of this bearing may be fixed to the frame of the TLU 200, while the inner race may be connected to the rotating platform that supports the aircraft's NLG.

The rotational movement of the automated turntable 202 may be controlled by a servo system that provides precise position control. This servo system may include a motor driver that interprets commands from the main controller and translates them into the appropriate voltage and current signals to drive the motor. The motor may be equipped with an integrated brake system that can hold the turntable in position when rotation is not required, providing additional safety and stability.

To monitor and control the positioning of the automated turntable 202, an absolute encoder 216 may be incorporated into the system. The absolute encoder 216 may provide continuous, high-resolution feedback on the exact angular position of the turntable. Unlike incremental encoders that only measure relative movement, an absolute encoder can determine the turntable's position immediately upon startup, without requiring a homing or reference move.

In some aspects, the absolute encoder 216 may utilize a multi-turn design, allowing it to track multiple complete rotations of the turntable. This feature may be particularly useful in applications where the turntable needs to rotate through multiple revolutions during operation. The absolute encoder 216 may communicate with the system's controller using a digital interface, such as SSI (Synchronous Serial Interface) or BiSS (Bidirectional Serial Synchronous Interface), providing fast and reliable position data.

The controller may use the data from the absolute encoder 216 to implement closed-loop control of the turntable's position. This control system may allow for extremely precise positioning, potentially achieving accuracy within fractions of a degree. The controller may also use this position data to implement motion profiles for smooth acceleration and deceleration of the turntable, reducing wear on the system and providing a more stable platform for the aircraft's NLG.

In some implementations, the system may include multiple redundant absolute encoders to enhance reliability and safety. These redundant encoders may be compared in real-time to detect any discrepancies that could indicate a sensor failure or other system issue.

The combination of the high-precision motor, gear reduction system, and absolute encoder feedback may allow the automated turntable 202 to achieve both rapid rotation for efficient aircraft positioning and extremely fine adjustments for precise alignment. This capability may be particularly useful in confined spaces or when aligning the aircraft with specific ground markings or equipment.

TLU 200 includes a gate 204, which can serve as an entry and exit point for the TLU 200. Adjacent to the gate 204, on either side, are lock actuators 206 and gate actuators 208. These actuators are responsible for the operation and locking mechanism of the gate 204. In some cases, the gate 204 is configured to automatically unlock, open to receive the NLG, close to secure the NLG, and lock.

In some implementations, the actuators used in the TLU 200, such as the lock actuators 206, gate actuators 208, and moving floor actuators 214, may be entirely electrical. This configuration may eliminate the need for hydraulic systems, potentially offering several advantages.

Electrical actuators may provide precise control and positioning capabilities, allowing for smooth and accurate movements of the gate 204, moving floor 210, and other components. The use of electrical actuators may also eliminate concerns associated with hydraulic systems, such as fluid leaks, pressure loss, or temperature-related performance variations. This may result in a more environmentally friendly system, as there is no risk of hydraulic fluid contamination. Additionally, electrical actuators may require less maintenance compared to hydraulic systems, potentially reducing downtime and operational costs.

In some aspects, electrical actuators may offer improved energy efficiency, as they may only consume power when actively moving or holding a position. This characteristic may contribute to the overall energy efficiency of the tow vehicle 100 or standalone TLU 200, potentially extending operational time between charges for battery-powered implementations.

The electrical actuators may be designed with built-in position feedback mechanisms, allowing for real-time monitoring of their status and position. This feature may enhance the system's ability to detect and respond to any irregularities or malfunctions, potentially improving overall reliability and safety.

In some cases, the use of electrical actuators may allow for a more compact and lightweight design of the TLU 200. This may be particularly advantageous in applications where space or weight constraints are significant factors, such as in compact tow vehicles or portable systems.

In some implementations, the TLU 200 may incorporate an emergency gate release mechanism to allow manual opening of the gate 204 in the event of a power failure or system malfunction. This feature may enhance the safety and reliability of the TLU 200 by providing a backup method for releasing an aircraft's NLG in emergency situations.

The emergency gate release mechanism may be designed as a mechanical system that can be operated without electrical power. In some aspects, this mechanism may include a manual lever or handle located on the exterior of the TLU 200, easily accessible to ground personnel. When activated, this lever may disengage the lock actuators 206 and override the gate actuators 208, allowing the gate 204 to be opened manually.

In some aspects, the emergency gate release mechanism may be designed with a fail-safe approach, where the loss of power automatically triggers the release of the locking mechanism. This design may ensure that the gate 204 can be opened manually even if the emergency release lever is not immediately accessible or operable.

The TLU 200 incorporates a moving floor 210, which can be a segmented platform capable of horizontal and vertical movement. This moving floor 210 can be controlled by the moving floor actuators 214, positioned at opposite corners of the unit. In some embodiments, the moving floor 210 is configured to adjust to accommodate different nose wheel sizes. In some aspects, the moving floor 210 may be configured to automatically slide under the NLG wheel or wheels, working in conjunction with the NLG clamps 212 to effectively "grab" the NLG from both the top and bottom.

The moving floor 210 may incorporate a self-locking mechanism to prevent unintended movement under mechanical loads. This feature may enhance the safety and stability of the TLU 200 during aircraft handling operations. In some implementations, the self-locking mechanism may employ a brake system integrated with the moving floor actuators 214. This brake system may automatically engage when the actuators are not in operation, securing the moving floor 210 in its current position. The brakes may be designed to hold the full weight of the aircraft's NLG, ensuring that the moving floor 210 remains stationary even under maximum load conditions.

The control system of the TLU 200 may monitor the status of the self-locking mechanism, ensuring that it is properly engaged before allowing any load to be placed on the moving floor 210. This integration may provide an additional safety check in the aircraft handling process, potentially reducing the risk of accidents or equipment damage.

The operation of the moving floor 210 may involve a series of coordinated movements. As the TLU 200 surrounds the NLG, the moving floor 210 may extend outward, positioning itself beneath the NLG wheels. This extension may be controlled by the moving floor actuators 214, which may provide precise horizontal movement of the floor segments.

Once the moving floor 210 is properly positioned under the NLG wheels, the moving floor 210 may then function as an elevator mechanism. In this phase of operation, the moving floor actuators 214 may control the vertical movement of the floor, lifting the NLG off the ground. This lifting action may be synchronized with the overall operation of the TLU 200, allowing for a smooth and controlled elevation of the aircraft's nose.

The ability of the moving floor 210 to adjust to different nose wheel sizes may enhance the versatility of the TLU 200. This adaptability may be achieved through the use of segmented floor panels that can be individually controlled or through a flexible floor design that can conform to various wheel diameters.

In some implementations, sensors integrated into the moving floor 210 may detect the weight and position of the NLG wheels, providing feedback to the control system. This feedback may allow for real-time adjustments to the floor position and lifting force, ensuring optimal support and stability throughout the capturing and lifting process.

The moving floor 210, in combination with other components of the TLU 200, may contribute to a fully autonomous and precise method of aircraft handling. This system reduces the need for manual intervention, enhances safety, and improves the efficiency of ground operations in various aviation environments.

After the NLG has been lifted, the NLG clamps 212 may engage from above, securing the upper portion of the NLG. The combination of the moving floor 210 supporting from below and the NLG clamps 212 securing from above may create a stable and secure hold on the NLG.

One or more NLG clamps 212 (also referred to as nose wheel adapters) may be used to secure an aircraft's NLG. The NLG clamps 212 are positioned on opposite sides of the automated turntable 202. In some cases, the NLG clamps 212 are configured to automatically position themselves to hold down the NLG when weight is detected on the moving floor 210. The NLG clamps 212 may include electro-cylinders connected to the CAN bus.

The NLG clamps 212 may be operated by fully electric actuators and controlled by the controller to provide precise and efficient securing of the aircraft's NLG. In some implementations, each NLG clamp 212 may be equipped with its own dedicated electric actuator, allowing for independent control and movement of each clamp.

The electric actuators for the NLG clamps 212 may utilize high-torque servo motors coupled with precision gear systems. These motors may provide the necessary force to securely clamp the NLG while also allowing for fine adjustments in positioning. The gear systems may enable smooth and controlled movement of the clamps, potentially reducing wear on both the clamps and the aircraft's landing gear.

In some aspects, the controller may utilize feedback from various sensors to determine the optimal positioning and clamping force for the NLG clamps 212. These sensors may include load cells to measure the weight distribution on the moving floor 210, proximity sensors to detect the exact position of the NLG, and force sensors within the clamps themselves to monitor the applied pressure.

In some cases, the NLG clamps 212 may automatically adjust to accommodate different NLGs for various types of aircraft. This adjustment may be based on data from sensors 104 and/or sensors 106, which may identify the type of aircraft and/or the precise dimensions and configurations of the NLG. This adaptive capability may enable the TLU 200 to handle a wide range of aircraft types efficiently.

The controller may implement closed-loop control algorithms to manage the operation of the NLG clamps 212. When weight is detected on the moving floor 210, the controller may initiate a sequence to position the clamps. This sequence may involve gradually closing the clamps while continuously monitoring sensor feedback to ensure proper alignment and contact with the NLG.

In some implementations, the controller may automatically adjust the clamping force dynamically based on the aircraft's weight and environmental conditions. For example, in windy conditions, the controller may increase the clamping force to provide additional stability. The electric actuators may allow for rapid adjustments in response to changing conditions or operational requirements.

The controller may also coordinate the operation of the NLG clamps 212 with other components of the TLU 200. For instance, the clamping process may be synchronized with the movement of the gate 204 and the adjustment of the moving floor 210 to ensure a smooth and efficient capture of the NLG.

In some cases, the electric actuators for the NLG clamps 212 may incorporate built-in position encoders. These encoders may provide real-time feedback on the exact position of each clamp, allowing the controller to maintain precise control over the clamping process. This feedback may also be used for diagnostic purposes, potentially enabling early detection of any misalignments or mechanical issues.

The use of fully electric actuators for the NLG clamps 212 may offer advantages in terms of maintenance and reliability. These actuators may require less frequent maintenance compared to hydraulic systems, and their performance may be less affected by temperature variations. Additionally, the electric actuators may provide more consistent operation over time, potentially enhancing the overall reliability of the aircraft capturing process.

In some implementations, the controller may include safety features specifically designed for the operation of the NLG clamps 212. These features may include torque limiting to prevent over-clamping, obstacle detection to avoid potential collisions during clamp movement, and emergency release functions that can quickly disengage the clamps if necessary.

Figure 2B:
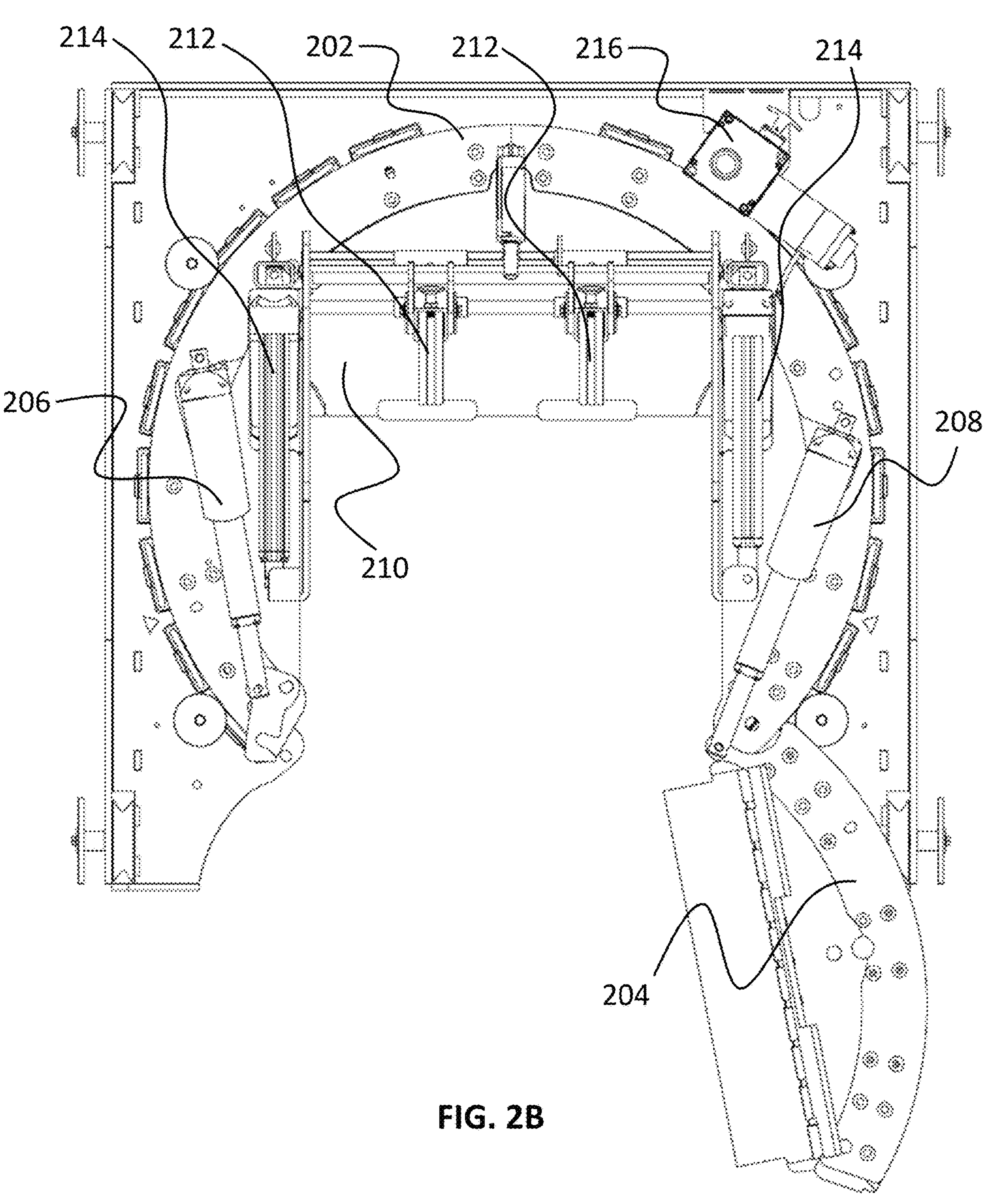
FIG. 2B illustrates a top view of the turntable lifting unit of FIG. 2A with an open gate.

Referring to FIG. 2B, the TLU 200 is depicted in a top view, providing a view of its components and their functions in capturing, securing, and manipulating the aircraft's NLG. The gate 204 in FIG. 2B is shown in an open position, allowing for the entry of the aircraft's NLG into the TLU 200. The gate 204 is coupled to the automated turntable 202 and is configured to automatically unlock and open to receive the NLG. Once the NLG is positioned within the TLU 200, the gate 204 is configured to close and secure the NLG. The gate 204 is then locked to ensure the secure attachment of the NLG to the TLU 200.

Adjacent to the gate 204, on either side, are lock actuators 206 and gate actuators 208. These actuators are responsible for the operation and locking mechanism of the gate 204. The lock actuators 206 are configured to engage and disengage the locking mechanism of the gate 204, ensuring that the gate 204 remains securely closed during the aircraft capturing and lifting process. The gate actuators 208 are responsible for the opening and closing operations of the gate 204.

The autonomous operation of the gate 204 and its associated actuators 206 and 208 contributes to the overall efficiency and safety of the aircraft capturing and lifting process. By automating these operations, the need for manual intervention is reduced, minimizing the risk of human error and potential damage to the aircraft's NLG. Furthermore, the autonomous operation of the gate 204 allows for rapid and precise capturing and lifting of the aircraft, enhancing the overall efficiency of the aircraft ground handling operations.

Figure 2C:
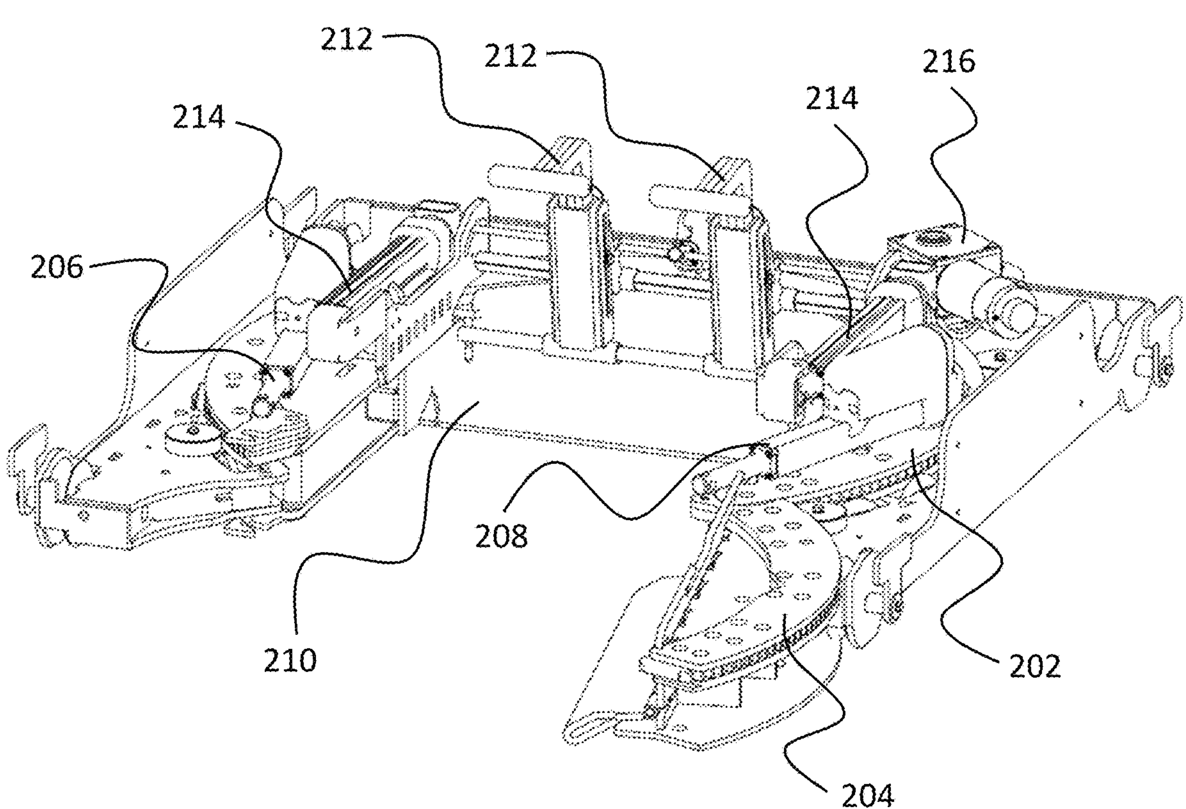
FIG. 2C illustrates a perspective view of the turntable lifting unit of FIG. 2A with an open gate.

Referring to FIG. 2C, the TLU 200 is depicted in a perspective view. The integration of the components described above may enable a series of autonomous processes for adjusting to, securing, and lifting the aircraft's NLG. The system may first use sensor data to determine the approaching aircraft's NLG configuration. Based on this information, the moving floor 210 and NLG clamps 212 may adjust to the appropriate positions.

As the aircraft approaches, the gate 204 may open, allowing the NLG to enter the unit. Once the NLG is detected in the correct position, the gate 204 may close and lock, securing the NLG within the unit. The moving floor 210 may then make fine adjustments to ensure optimal support.

With the NLG properly secured, the automated turntable 202 may initiate the lifting process, while the NLG clamps 212 engage to hold the NLG securely in place. Throughout this process, the absolute encoder 216 may provide continuous feedback to ensure precise control and positioning of all components.

This autonomous sequence may streamline the aircraft capturing and lifting process, potentially reducing the time required for ground operations and minimizing the risk of human error or equipment damage. The design of the TLU 200 may allow for efficient handling of various aircraft types, adapting to different NLG configurations and sizes with minimal manual intervention.

During autonomous pushback processes, the TLU 200 may work in coordination with the tow vehicle's sensor system. As the tow vehicle follows the pushback line and makes turns, the TLU 200 may automatically adjust its position and orientation to maintain the proper alignment of the NLG.

In some cases, the TLU 200 may include additional sensors specifically designed to monitor the orientation of the NLG relative to the aircraft's roll axis. These sensors may provide real-time data that allows the system to make immediate corrections if any misalignment is detected.

The CAN bus may facilitate rapid communication between all components of the TLU 200 and the tow vehicle's control systems. This high-speed data exchange may enable the system to respond quickly to any changes in alignment, ensuring that the NLG remains straight relative to the aircraft's roll axis throughout the pushback and towing operations.

Figure 3:
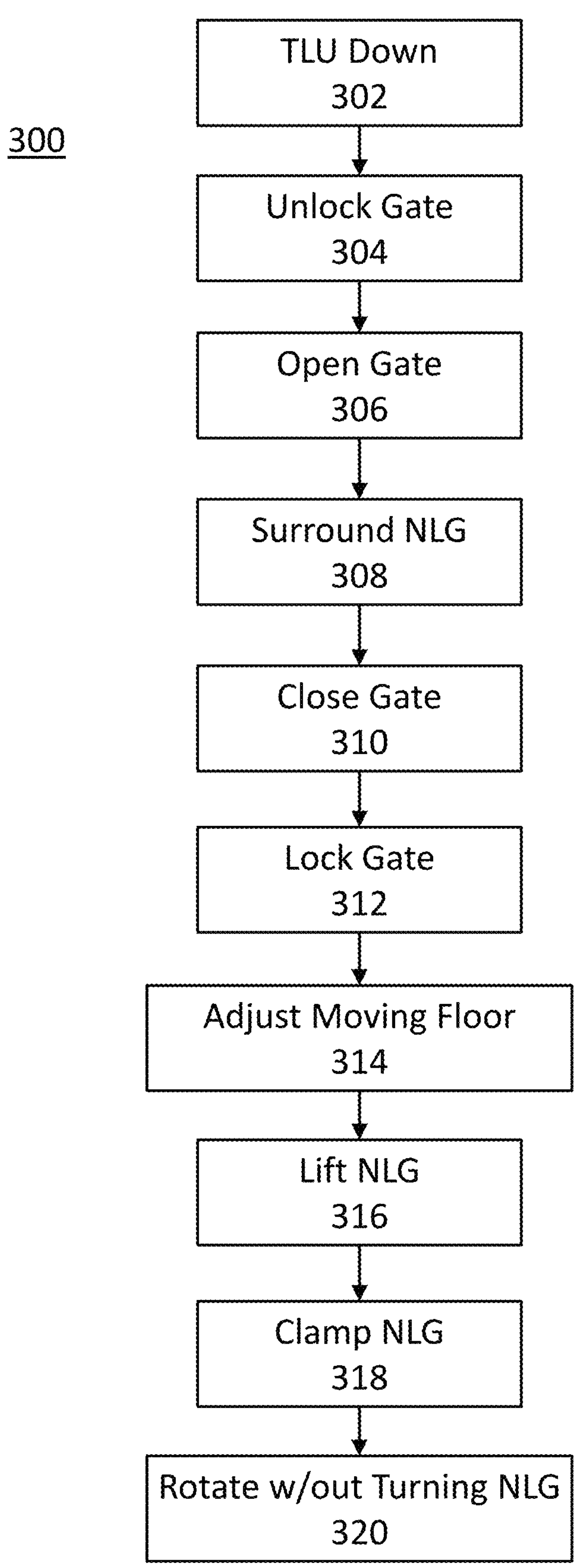
FIG. 3 illustrates a flowchart for an autonomous aircraft capturing and lifting process, according to aspects of the present disclosure.

FIG. 3 illustrates an autonomous aircraft capturing process 300 that may involve a sequence of steps for lowering the TLU, securing the NLG, and preparing for aircraft repositioning. The process may begin with step 302, where the TLU is lowered into position. This step may involve adjusting the height of the TLU to align with the aircraft's NLG.

Following the lowering of the TLU, the process may proceed to step 304, where the gate is unlocked. This action may prepare the TLU to receive the aircraft's NLG. Once unlocked, the process may move to step 306, where the gate is opened. The open gate may provide a clear path for the NLG to enter the TLU.

In step 308, the TLU may surround the NLG. This step may involve precise positioning of the TLU around the NLG, using sensor data to guide the alignment.

In some embodiments, the TLU may operate in coordination with the tow vehicle's drive system to automatically maneuver the tow vehicle around the NLG and adjust the TLU accordingly to capture the NLG. This coordinated operation may involve a sophisticated interplay between the tow vehicle's sensors, drive system, and the TLU's components.

The tow vehicle's sensor system, which may include sensors 104 and 106, may continuously scan the environment to detect the position and orientation of the aircraft's NLG. As the tow vehicle approaches the aircraft, the controller may process this sensor data in real-time to determine the optimal path for positioning the TLU around the NLG.

Based on this processed data, the controller may send commands to the tow vehicle's drive system, which may include the drive wheels 110. These commands may direct the tow vehicle to execute precise movements, potentially including forward, backward, and rotational maneuvers. The drive system may utilize its independent wheel control to perform these movements with a high degree of accuracy.

As the tow vehicle maneuvers, the TLU may simultaneously adjust its components in preparation for NLG capture. The gate 204 may open at the appropriate time, guided by the gate actuators 208. The moving floor 210 may adjust its position using the moving floor actuators 214, preparing to receive the NLG. The NLG clamps 212 may also pre-position themselves based on the anticipated NLG configuration.

The controller may continuously update these adjustments as the tow vehicle approaches the NLG, using feedback from the absolute encoder 216 and other sensors to ensure precise alignment. In some cases, the automated turntable 202 may rotate to achieve the optimal orientation for NLG capture.

In some implementations, the system may utilize machine learning algorithms to optimize this coordinated operation. These algorithms may analyze data from previous capture operations to refine the maneuvering and adjustment processes, potentially improving efficiency and accuracy over time.

The seamless coordination between the tow vehicle's drive system and the TLU may allow for swift and precise NLG capture, potentially reducing the time required for aircraft handling operations. This autonomous approach may also enhance safety by minimizing the need for personnel to be in close proximity to the aircraft during the capture process.

Once the NLG is properly positioned within the TLU, the process may advance to step 310, where the gate is closed. This action may be followed by step 312, where the gate is locked, securing the NLG within the TLU.

After the NLG is enclosed and secured, the process may proceed to step 314, where the moving floor is adjusted. This adjustment may accommodate the specific dimensions and configuration of the captured NLG. In some aspects, the moving floor may be designed to slide under the NLG in a manner similar to a wedge, providing pressure on the opposite side of the NLG wheel(s) as the gate.

Once the NLG is positioned on the moving floor 210 and the gate 204 is closed and locked, the system may initiate the lifting process at step 316. The moving floor actuators 214 may raise the entire floor assembly, including the captured NLG. This lifting action may raise the aircraft's nose so that it can be clamped and fully secured prior to any towing and/or pushback operations.

In step 318, the NLG may be clamped (e.g., with NLG clamps 212), providing additional security and stability at the top of the NLG.

The final step in the process, step 320, may involve rotating the TLU without turning the NLG, i.e., the tow vehicle can turn in place while maintaining the orientation of the TLU and the captured NLG. This capability may enable the tow vehicle to begin pulling the aircraft in any direction without applying undue stress to the NLG.

The tow vehicle may utilize its drive system, which may include independently controlled drive wheels, to execute a rotation around its vertical axis. During this rotation, the TLU may remain stationary relative to the aircraft, potentially preventing any twisting forces from being applied to the NLG. This feature may be particularly useful in confined spaces or when precise aircraft positioning is required.

In some implementations, the controller may coordinate the rotation of the tow vehicle with real-time feedback from the absolute encoder and other sensors within the TLU. This coordination may help ensure that the orientation of the NLG remains constant throughout the rotation process. The system may make continuous micro-adjustments to compensate for any slight deviations, potentially maintaining the alignment between the aircraft and the tow vehicle.

The ability to rotate without turning the NLG may offer several potential benefits. It may reduce wear and tear on the aircraft's landing gear by minimizing lateral forces during maneuvering. This feature may also enhance operational flexibility, allowing the tow vehicle to reposition itself relative to the aircraft without the need for complex multi-point turns or disconnecting and reconnecting the NLG.

In some cases, this rotational capability may be combined with the tow vehicle's visual line guidance and object recognition system. The system may detect obstacles or markings in the surrounding environment and use this information to guide the rotation process. This integration may allow for precise alignment with taxiway lines or positioning within tight hangar spaces.

The rotation without NLG turning feature may also contribute to the overall efficiency of ground operations. It may allow for quicker aircraft repositioning, potentially reducing turnaround times and improving gate utilization at busy airports. In some implementations, this feature may be particularly valuable for pushback operations, enabling the tow vehicle to align itself with the designated pushback path without placing stress on the aircraft's landing gear.

Figure 4:
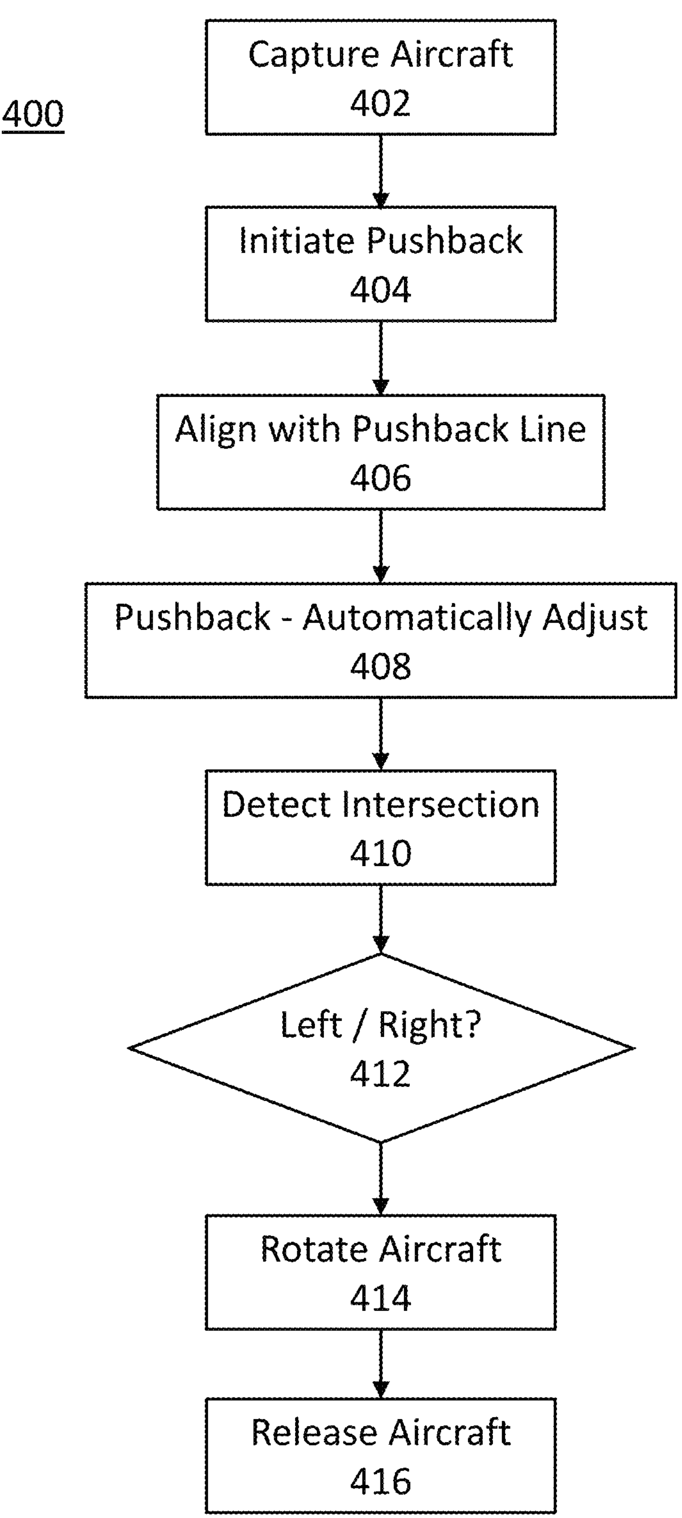
FIG. 4 illustrates a flowchart for an autonomous pushback process, according to aspects of the present disclosure.

FIG. 4 illustrates an autonomous pushback process 400 that may involve a sequence of steps for capturing an aircraft, initiating pushback, and aligning the aircraft with a pushback line. The process may begin with step 402, where the aircraft is captured by a tow vehicle (e.g., an autonomous or semi-autonomous tow vehicle) using the autonomous aircraft capturing process 300 described in FIG. 3. This step may involve securing the aircraft's nose landing gear (NLG) within the turntable lifting unit (TLU) of the tow vehicle.

Figure 5:
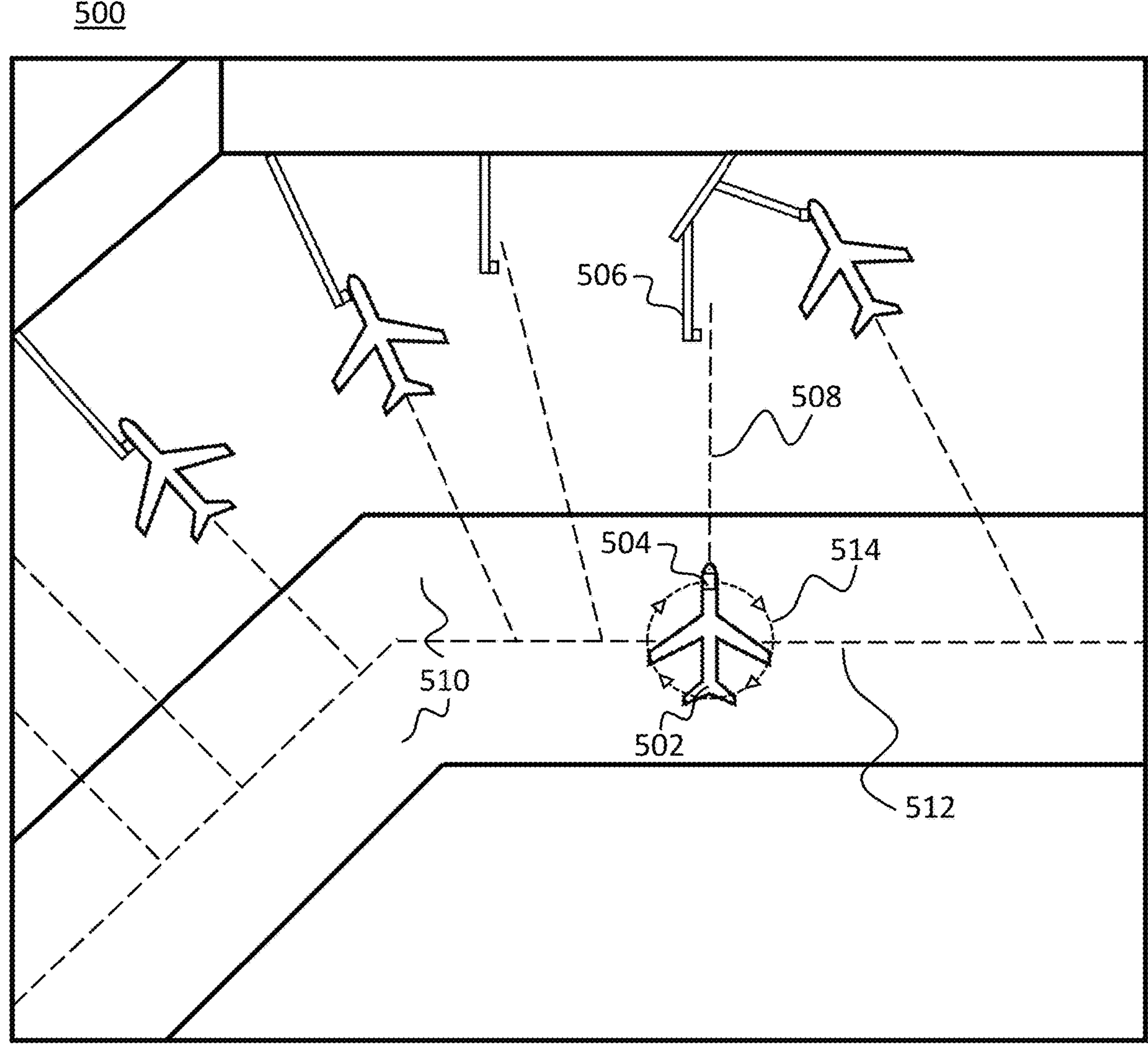
FIG. 5 illustrates a top view diagram of an airport layout and autonomous pushback operation, according to aspects of the present disclosure.

In airports and on aircraft carriers, pushback lines may be used as visual guides for aircraft ground movements, particularly during pushback operations. These lines may be painted or otherwise marked on the ground surface, providing a clear path for aircraft to follow when being pushed back from gates, parking positions, or other stationary locations. FIG. 5, for example, illustrates a sample airport layout 500, including various aircraft 502, tow vehicle 504, passenger gates 506, pushback lines 508, taxiway 510, and centerline 512.

At airports, pushback lines may serve several purposes. They may help guide tow vehicles and aircraft along predetermined routes, ensuring safe clearance from nearby obstacles, other aircraft, and ground equipment. These lines may also assist in maintaining orderly traffic flow on the apron or tarmac, potentially reducing the risk of collisions or congestion.

On aircraft carriers, pushback lines may be particularly crucial due to the limited space available on the flight deck. These lines may guide precise aircraft movements during repositioning operations, helping to optimize the use of available deck space and facilitate efficient launch and recovery operations.

The autonomous navigation of pushback lines by aspects of the disclosure may significantly enhance safety, increase efficiency, and reduce personnel requirements during pushback operations. By utilizing advanced sensor systems and intelligent control algorithms, the tow vehicle may precisely follow pushback lines without constant human guidance.

In terms of safety, the autonomous system may continuously monitor the environment for potential obstacles or hazards using its sensor array. This constant vigilance may reduce the risk of collisions with other vehicles, equipment, or personnel on the tarmac. The system may also maintain a consistent and optimal distance from the aircraft, potentially minimizing the risk of damage to the aircraft or tow vehicle during the pushback process.

Efficiency may be improved in several ways. The autonomous system may execute pushback maneuvers with a high degree of precision and consistency, potentially reducing the time required for each operation. This precision may allow for smoother transitions between different phases of the pushback process, such as initial alignment, straight pushback, and turns at intersections. The system may also optimize the pushback path based on real-time data, potentially adapting to changing conditions on the tarmac more quickly than a human operator.

The reduction in required personnel may also be substantial. Traditional pushback operations often require multiple ground crew members, including a tow vehicle operator, wing walkers, and a person in communication with the flight deck. With autonomous pushback capabilities, many of these roles may be consolidated or eliminated. The system may perform the functions of guidance, obstacle detection, and aircraft alignment without direct human intervention. This reduction in personnel may lead to cost savings for airlines and airport operators, as well as potentially increasing the number of simultaneous pushback operations that can be managed with existing staff levels.

Furthermore, the autonomous system may operate effectively in various weather conditions and visibility levels, potentially maintaining consistent performance in situations where human operators might struggle. This capability may contribute to improved on-time performance and reduced weather-related delays in pushback operations.

The integration of the autonomous pushback system with other airport management systems may further enhance its benefits. For example, the system may coordinate with air traffic control and gate management systems to optimize the timing and routing of pushback operations, potentially improving overall airport efficiency.

Following the capture of the aircraft, the process may proceed to step 404, where the pushback is initiated. In this step, the tow vehicle (e.g., tow vehicle 504) may begin to move, pushing the aircraft (e.g., aircraft 502) away from its parking position (e.g., at passenger gate 506) toward a taxiway or runway (e.g., taxiway 510). The tow vehicle may include a controller configured to receive data from the sensor system, which may comprise sensors 104 and 106. This sensor system may detect the position of the NLG relative to a pushback line (e.g., pushback line 508) on the ground.

In step 406, the tow vehicle in coordination with the TLU may automatically align the aircraft with the pushback line. The controller may process the data from the sensor system to determine the position of the NLG relative to the pushback line. Based on this information, the controller may control the TLU and automatically adjust the position of the tow vehicle relative to the NLG. This adjustment may help maintain alignment of the aircraft with the pushback line during the pushback operation.

In step 408, the autonomous pushback process may involve continuously adjusting the position of the aircraft tow vehicle to maintain alignment of the aircraft with the pushback line. The controller may process real-time data from the sensor system to determine any deviations from the desired alignment. Based on this information, the controller may send commands to the turntable lifting unit and drive systems of the tow vehicle to make fine adjustments to the vehicle's position and orientation.

As the pushback operation continues, the controller may be configured to detect, at step 410, when the main landing gear (MLG) of the aircraft reach an intersection of the pushback line with another line (e.g., a runway or taxiway centerline 512) indicating a turn. This detection may be accomplished through the sensor system or the visual line guidance and object recognition system. The system may use various methods to detect the pushback line and intersections, such as computer vision algorithms, LiDAR technology, or other sensing techniques.

As the pushback operation progresses, the system may continuously monitor for intersections in the pushback line. When an intersection is detected, the controller may analyze the geometry of the intersection to determine the available turn options. This analysis may involve processing data from multiple sensors to create a comprehensive understanding of the intersection layout.

Upon detecting an intersection, the controller may be configured to receive input indicating a turn direction at step 412. This input may come from a human operator (e.g., via a user interface on the tow vehicle or remote control system) or from a pre-programmed pushback plan. In some implementations, the system may also be capable of autonomously determining the appropriate turn direction based on the airport layout and the aircraft's destination, signals or gestures from ground personnel, radio instructions from air traffic control or ground control, and/or instructions from air traffic management systems.

Once the turn direction is determined, the system may initiate the aircraft rotation process in step 414. Based on the detected intersection and the indicated turn direction, the controller may automatically rotate the aircraft in place on its main landing gear (e.g., as illustrated by turn in place operation 514 in FIG. 5). This rotation may be achieved by causing the two sets of MLG wheels to rotate in opposite directions, effecting a stationary turn.

In some implementations, the sensor system may determine how to rotate the aircraft by calculating the distance between the NLG and the MLG. This calculation may be performed using data from various sensors, such as LiDAR, cameras, or ultrasonic sensors, which may provide precise measurements of the aircraft's dimensions and wheel positions.

Once the distance between the NLG and MLG is determined, the controller may use this information to calculate the optimal angle at which the tow vehicle should position itself relative to the aircraft. This positioning may allow the tow vehicle to initiate a turn that causes the wheels of the MLG to rotate in opposite directions.

The tow vehicle may then align itself at the calculated angle. As the tow vehicle begins to move, it may apply force to the NLG in a way that causes the aircraft to pivot around its center of gravity. This pivoting motion may result in the MLG wheels rotating in opposite directions, with one set of wheels moving forward and the other set moving backward.

By initiating the turn in this manner, the system may minimize the lateral forces applied to the MLG wheels. This approach may result in little to no strain on the MLG wheels during the turning process, potentially reducing wear and tear on the aircraft's landing gear components.

The controller may continuously monitor the rotation of the aircraft using its sensor system, making real-time adjustments to the tow vehicle's position and force application as needed. This ongoing adjustment may help maintain the optimal turning angle throughout the rotation process, ensuring smooth and efficient aircraft movement.

In some aspects, the system may also take into account factors such as the aircraft's weight distribution, tire pressure, and surface conditions when calculating the optimal turning strategy. These considerations may allow the system to further refine its approach, potentially resulting in even smoother and more efficient aircraft rotations.

During the rotation, the system may continuously monitor the aircraft's position relative to the new pushback line direction. The controller may make real-time adjustments to ensure a smooth transition onto the new path, potentially using predictive algorithms to anticipate and correct for any deviations.

Throughout the pushback operation, the controller may continuously adjust the position of the tow vehicle to maintain alignment with the pushback line and execute any required turns. This autonomous process may help ensure precise and consistent pushback operations, potentially reducing the risk of errors and improving overall efficiency.

In some implementations, the autonomous pushback process may continue indefinitely, accommodating any number of turns or directional changes, until the pilot of the aircraft assumes control for taxiing or take-off. This extended pushback capability may allow for greater flexibility in aircraft ground movements, potentially enabling more efficient use of airport taxiways and runways.

The tow vehicle may be configured to follow complex pushback paths that may include multiple turns, curves, and straight sections. The visual line guidance and object recognition system may continuously detect and interpret ground markings, allowing the tow vehicle to navigate these paths accurately. In some cases, the system may be capable of following temporary or newly painted lines, adapting to changes in airport layout or traffic flow.

During extended pushback operations, the controller may continuously monitor for potential obstacles or conflicts with other ground traffic. The sensor system may detect other vehicles, equipment, or personnel in the vicinity, and the controller may adjust the pushback path or speed accordingly to maintain safe operations. In some implementations, the system may be integrated with airport traffic management systems, allowing for coordinated movements with other aircraft and ground vehicles.

The autonomous pushback system may also be capable of responding to dynamic instructions from air traffic control or ground control. In some aspects, the system may receive updated routing information in real-time, allowing for on-the-fly adjustments to the pushback path. This flexibility may be particularly useful in busy airport environments where traffic patterns may change rapidly.

Upon completion of the pushback operation, the controller may be further configured to automatically release the aircraft from the tow vehicle in step 416. The controller may first bring the tow vehicle to a complete stop at the designated release point. It may then command the TLU to lower the aircraft's NLG to the ground.

Once the NLG is firmly on the ground, the system may command the gate of the TLU to unlock and open. The tow vehicle may then slowly move away from the aircraft, ensuring that all components are clear of the aircraft's structure. Throughout this release process, the system may continue to monitor the position and status of all components using its sensor array to ensure a safe and controlled release. After the physical separation is complete, the system may perform a final check to confirm that all systems are disengaged and that the tow vehicle is at a safe distance from the aircraft.

The autonomous release process may help streamline the transition from pushback to taxiing, potentially reducing the time required for this phase of ground operations. By automating these steps, the system may also help reduce the risk of errors or miscommunications that could occur during a manual handover process.

As discussed above, the autonomous aircraft capturing and lifting system may incorporate advanced control and sensing capabilities to enhance its performance in aircraft handling and towing operations. The controller may integrate data from multiple sensors to create a comprehensive understanding of the system's environment and the aircraft's position.

In some aspects, the autonomous aircraft capturing and lifting system may include a visual line guidance and object recognition system. The system may be camera-based and may be configured to detect various visual cues, including line markings, objects, or symbols on the ground or in the surrounding environment, as well as human gestures from ground personnel.

In some implementations, the system may include an artificial intelligence/machine learning (AI/ML) component. This component may be trained on real-world airport operations data, allowing it to interface effectively with the sensor fusion system. The AI/ML component may assist in object, symbol, and gesture recognition, potentially improving the system's ability to interpret its environment. Additionally, the AI/ML component may contribute to decision-making processes, potentially enhancing the system's autonomy and adaptability.

The AI/ML component may also provide additional safety features. For example, it may be capable of identifying potential hazards or unusual situations that might not be easily detected by traditional sensor systems. This enhanced situational awareness may contribute to safer operations in busy airport environments.

In some aspects, the system may include an interface component configured to access a digital twin of the operating environment. This digital twin may be a fixed representation of the airport or aircraft carrier layout stored in onboard memory, or it may be updated in real-time through wireless communications to reflect current conditions. By interfacing with this digital twin, the system may gain access to detailed information about the operating environment, potentially enhancing its ability to navigate and make decisions.

The digital twin interface may assist in the autonomous decision-making process by providing additional context for the system's operations. For example, it may offer information about scheduled aircraft movements, temporary obstacles, or changes in airport layout. This information may allow the system to anticipate challenges and adjust its operations accordingly, potentially improving efficiency and safety.

In some implementations, the digital twin data may reside in cloud-based storage systems, allowing for centralized management and real-time updates across multiple tow vehicles and airport systems. This cloud-based approach may offer several advantages for the autonomous aircraft capturing and lifting system.

The cloud infrastructure may provide scalable storage capacity, enabling the system to maintain detailed digital representations of multiple airports or aircraft carriers. This may allow tow vehicles to access up-to-date information about various operating environments, even when moving between different locations.

Real-time updates to the digital twin data may be facilitated through the cloud. As changes occur in the physical environment, such as temporary runway closures, construction zones, or equipment relocations, these updates may be immediately reflected in the cloud-based digital twin. Tow vehicles may then access this updated information in real-time, ensuring their operations are based on the most current environmental data.

The cloud-based digital twin may also enable collaborative updating and maintenance of the environmental data. Multiple stakeholders, including airport authorities, airlines, and ground handling companies, may contribute to and benefit from the shared digital representation. This collaborative approach may result in a more comprehensive and accurate digital twin.

In some aspects, the cloud-based digital twin may integrate data from various sources, including IoT sensors deployed throughout the airport, weather stations, and air traffic management systems. This integration may provide a rich, multi-layered representation of the operating environment, potentially enhancing the tow vehicle's ability to make informed decisions.

The cloud infrastructure may also facilitate advanced analytics and machine learning processes on the digital twin data. These processes may identify patterns, predict potential issues, and optimize routes based on historical and real-time data, potentially improving the efficiency and safety of tow vehicle operations.

The integration of these advanced control and sensing capabilities may result in a highly sophisticated autonomous aircraft capturing and lifting system. By combining sensor fusion, visual recognition, AI/ML capabilities, and digital twin integration, the system may be capable of performing complex aircraft handling and towing operations with a high degree of precision and adaptability.

In other aspects of the disclosure, the tow vehicle may be designed to operate in a wide range of environmental conditions, enhancing its versatility and reliability in various airport settings. In some aspects, the tow vehicle may be capable of functioning in temperatures ranging from −18° F. to +122° F., allowing for operation in both extremely cold and hot climates. The vehicle may also be designed to withstand up to 90% relative humidity, potentially enabling its use in humid coastal or tropical environments.

The drivetrain of the tow vehicle may incorporate advanced features for improved performance and reliability. In some implementations, the vehicle may be equipped with two individual drive units, each containing a redundant drive system (i.e., four total drive wheels). These drive systems may utilize twin electrical high-torque rotary drive hub gear motors, potentially providing enhanced traction and maneuverability. The power supply for these motors may be a 48V system, with a total effective power output of 20 kW AC. This configuration may offer a balance of power and efficiency suitable for aircraft towing operations.

In some implementations, for enhanced redundancy and performance, each drive wheel of the tow vehicle may be powered by its own dedicated motor, such as a 5 kW motor. This configuration may provide several potential benefits, including improved traction control, increased maneuverability, and enhanced fault tolerance.

The system may be designed to optimize efficiency during operation. For instance, once the initial inertia of the aircraft is overcome and the tow vehicle is in motion, the controller may selectively deactivate one or more motors. This approach may help conserve energy and extend the operational range of the vehicle.

The controller may continuously monitor various parameters such as wheel speed, traction, and power consumption. In some cases, if a wheel loses traction or if additional power is required, the system may rapidly reactivate the previously deactivated motors. This dynamic power management strategy may allow the tow vehicle to maintain optimal performance while minimizing energy consumption.

To enhance durability and reduce maintenance requirements, the tow vehicle may be fitted with solid rubber tires. These tires may offer increased resistance to wear and tear compared to pneumatic tires, potentially extending their operational lifespan and reducing the frequency of tire replacements.

The towing capacity of the vehicle may be substantial, potentially allowing it to handle a wide range of aircraft sizes. In some aspects, the tow vehicle may be capable of towing airframes with a maximum takeoff weight (MTOW) of up to 132,000 lbs. This capacity may enable the vehicle to service a variety of commercial and military aircraft, enhancing its versatility in different airport environments.

One of the key advantages of the tow vehicle may be its potential to improve space utilization in hangar and apron areas. The design and maneuverability of the vehicle may allow for more efficient positioning and movement of aircraft in confined spaces. In some cases, the use of this tow vehicle may increase the utilization of hangar space by up to 60% compared to conventional tow tractors. This improved space efficiency may lead to significant operational benefits for airports and maintenance facilities, potentially allowing for the accommodation of more aircraft in a given area or reducing the need for expansive hangar facilities.

Figure 6:
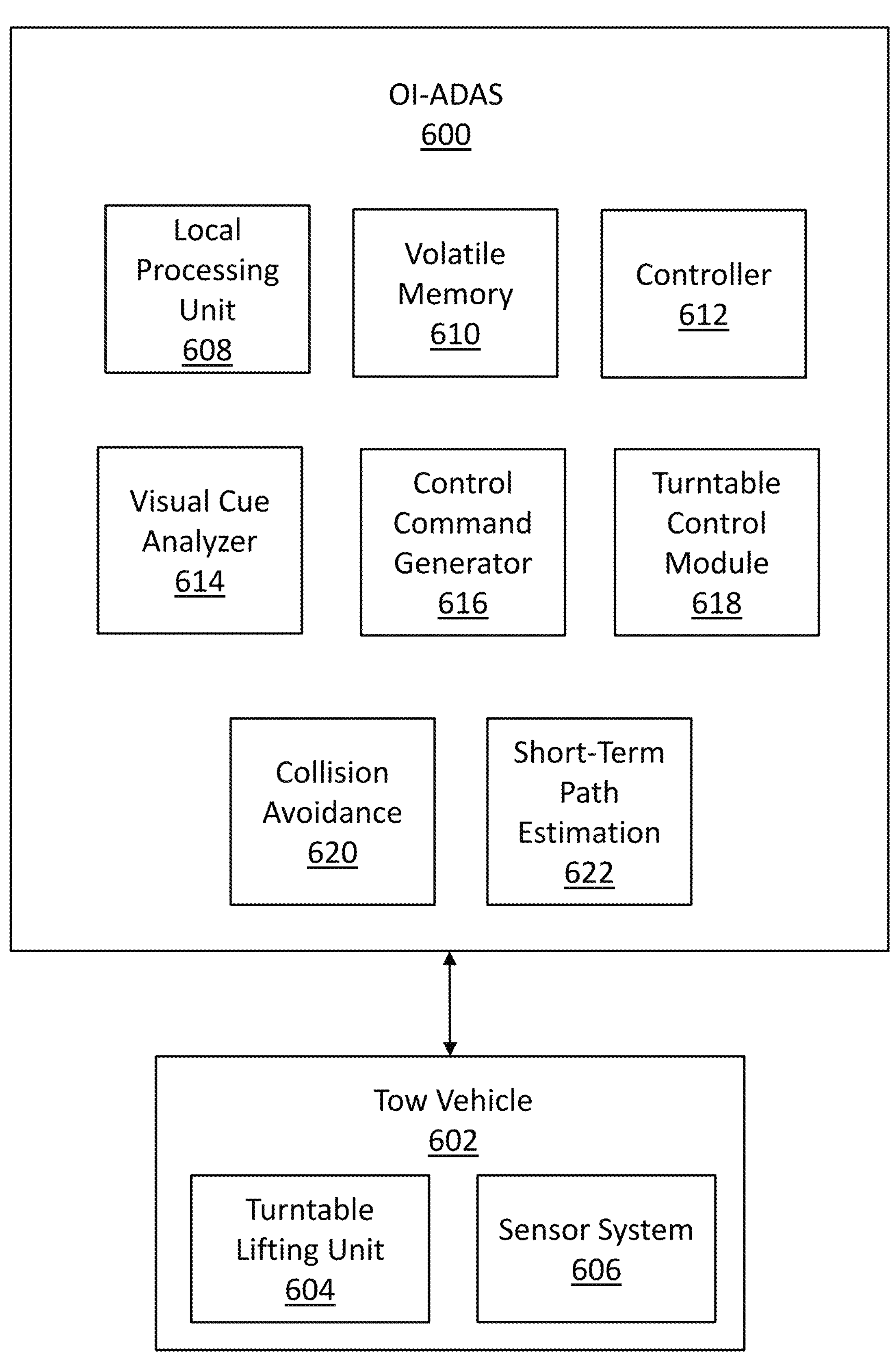
FIG. 6 illustrates a system diagram of an Offline Intelligence Advanced Driver Assistance System (OI-ADAS), according to aspects of the present disclosure.

In some aspects, the autonomous aircraft capturing and lifting system may incorporate an Offline Intelligence Advanced Driver Assistance System (OI-ADAS) to enhance its operational capabilities, e.g., by means of operator-guided towing with intelligent line following and parking assistance, and safety features such as real-time force feedback and emergency intervention. This system may be designed to function effectively even in environments with limited or no network connectivity, ensuring reliable performance across various airport settings. FIG. 6 illustrates a system diagram of an OI-ADAS 600 integrated with a tow vehicle 602 equipped with a turntable lifting unit 604 and a sensor system 606.

The OI-ADAS 600 may be utilized in various scenarios to enhance the efficiency and safety of aircraft ground operations. In some implementations, the system may serve as a parking aid to position aircraft in different airport environments. When operating in hangars or maintenance facilities, the OI-ADAS 600 may use its visual recognition capabilities to identify available parking spots and guide the tow vehicle 602 to precisely position the aircraft. The system may analyze the dimensions of the aircraft and the available space, potentially optimizing the placement to maximize hangar capacity.

For gate parking operations, the OI-ADAS 600 may assist in aligning the aircraft with passenger boarding bridges and ground service equipment. The system may detect visual markers on the tarmac and use them as reference points to ensure accurate positioning. In some cases, the OI-ADAS 600 may operate in a semi-autonomous mode, allowing human operators to make final adjustments while benefiting from the system's precision guidance.

When positioning aircraft in flightlines, the OI-ADAS 600 may coordinate with air traffic control systems to determine the optimal placement based on departure schedules and aircraft types. The system may guide the tow vehicle 602 along predetermined paths, potentially reducing congestion and improving overall flightline efficiency.

For line assistance and guidance during towing or automated pushback operations, the OI-ADAS 600 may utilize its visual recognition capabilities to detect and follow ground markings such as taxiway centerlines and pushback lines. The visual cue analyzer 614 may continuously monitor the aircraft's position relative to these lines, making real-time adjustments to maintain proper alignment. In some implementations, the OI-ADAS 600 may also recognize hand signals from ground personnel, allowing for seamless integration with existing airport communication protocols.

The OI-ADAS 600 may play a crucial role in automated turntable adjustments and operations. When capturing an aircraft's nose landing gear, the system may use its sensor array to detect the exact position and orientation of the landing gear. Based on this information, the turntable control module 618 may automatically adjust the turntable's position and angle to ensure optimal engagement. During lifting and rotation operations, the system may continuously monitor forces and adjust the turntable to maintain stability and prevent stress on the aircraft structure.

In terms of collision avoidance, the collision avoidance module 620 may employ a multi-layered approach to ensure safety during both fully autonomous and operator-guided operations. In autonomous mode, the system may create a dynamic safety envelope around the aircraft and tow vehicle 602, constantly scanning for potential obstacles using its sensor system 606. If an obstacle is detected, the collision avoidance module 620 may automatically adjust the vehicle's path or speed to avoid collision, as illustrated in steps 714 and 716 of FIG. 7.

During operator-guided operations, the collision avoidance module 620 may function as an intelligent safety co-pilot. The system may monitor the environment and the operator's inputs, potentially intervening if it detects an imminent collision risk. This intervention may take the form of haptic feedback through the controls, audible warnings, or in some cases, automatic braking or steering adjustments to prevent accidents. The system may monitor operator inputs during operator-controlled mode and detect intervention conditions including operator force applied to controls, excessive deviation from planned paths, and detection of imminent collision risks.

The collision avoidance capabilities of the collision avoidance module 620 may extend to detecting and avoiding both static and moving obstacles. The system may predict the trajectories of other vehicles or personnel in the vicinity, adjusting its own path to maintain safe distances. In low-visibility conditions, such as nighttime operations or in adverse weather, the OI-ADAS 600 may utilize its advanced sensor fusion techniques to maintain situational awareness and avoid collisions.

By incorporating these diverse use cases, the OI-ADAS 600 may significantly enhance the safety, efficiency, and versatility of aircraft ground handling operations across various airport environments.

The OI-ADAS 600 includes a local processing unit 608, a volatile memory 610, and a controller 612 integrated within the tow vehicle 602. The volatile memory 610 provides temporary data processing capabilities for processing sensor data without persistent storage. The controller 612, as described above with respect to earlier figures, interfaces with the turntable lifting unit 604, drive systems, and sensor system 606 through the CAN bus system to coordinate all vehicle operations. This local processing unit 608 may be equipped with high-performance computing capabilities, allowing it to handle complex calculations and decision-making processes without relying on external data centers or cloud-based resources. The controller 612 processes sensor data in real-time to determine the position of the tow vehicle 602 relative to the aircraft and ground markings, and generates appropriate commands for the vehicle's systems through the control command generator 616. The local processing unit 608 may utilize advanced algorithms and machine learning models that have been pre-trained on extensive datasets of airport layouts, aircraft specifications, and operational scenarios.

In some implementations, the OI-ADAS 600 may employ a multilayered architecture to process and analyze data from various onboard sensors. This architecture may include:

1. A perception layer that interprets raw sensor data to identify and classify objects in the tow vehicle's environment.

2. A localization layer that determines the precise position of the tow vehicle within the airport or carrier deck.

3. A planning layer that generates optimal paths and maneuvers based on the current situation and operational goals.

4. An execution layer that translates high-level plans into specific control commands for the tow vehicle's systems.

Figure 7:
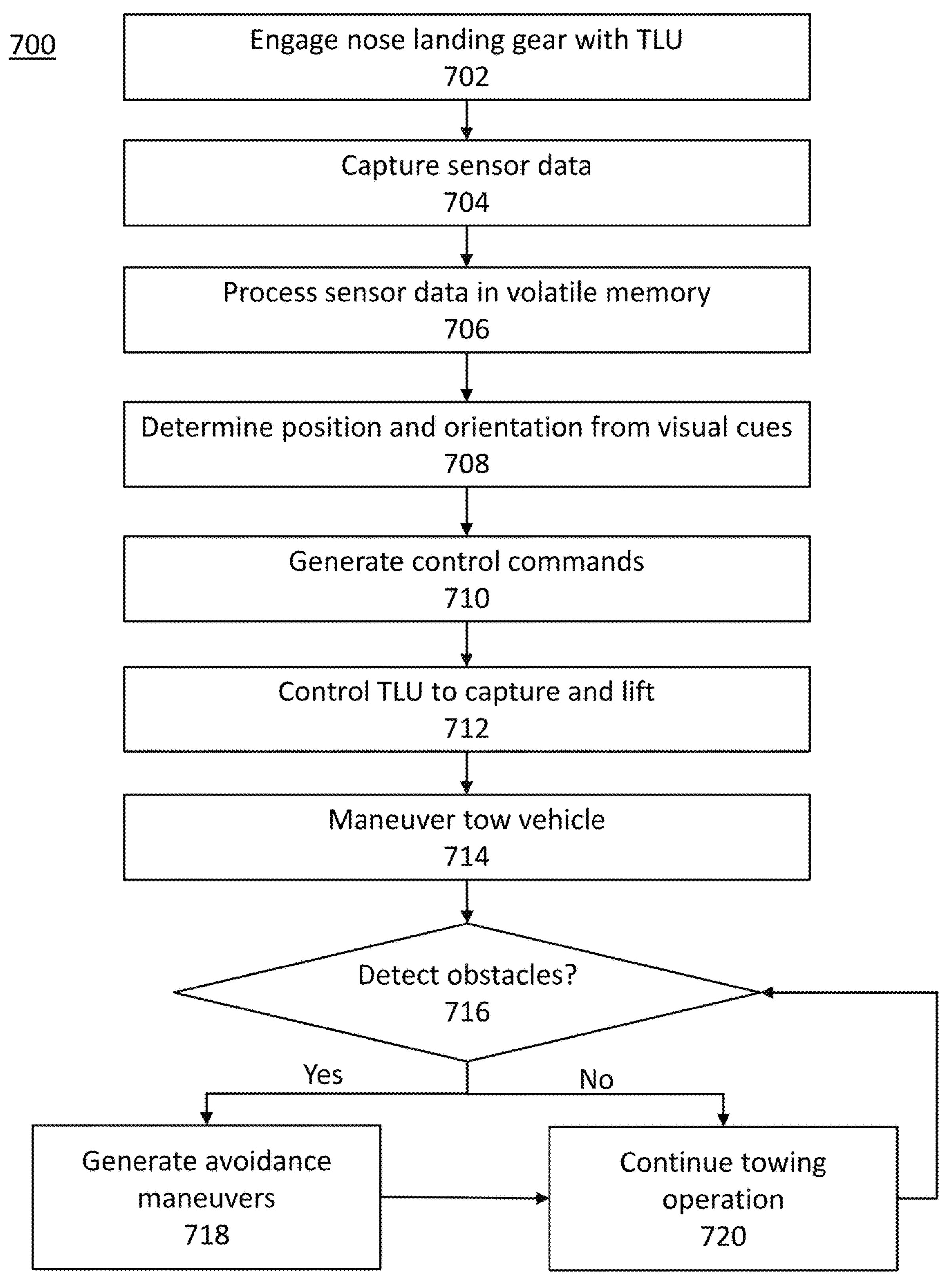
FIG. 7 illustrates a flowchart for an autonomous aircraft towing method, according to aspects of the present disclosure.

The system may utilize a combination of sensor fusion techniques to create a comprehensive understanding of its surroundings. This may involve integrating data from multiple sensor types, such as cameras (e.g., GMSL cameras), ultrasonic sensors, accelerometers, gyroscopes, and magnetometers. By combining these diverse data sources, the system may be able to maintain accurate situational awareness even in challenging conditions such as low visibility or inclement weather. As illustrated in FIG. 7, the method 700 includes capturing sensor data from a sensor system in step 702, processing the sensor data in volatile memory in step 704, and analyzing visual cues to determine position and orientation in step 706.

In some aspects, the OI-ADAS 600 may be specifically configured to operate in secure and network-denied environments, such as military installations or classified areas. In these implementations, the tow vehicle 602 may operate with no preexisting knowledge of the operating environment and retain no information about the environment after operation. All sensed data, including imagery, forces, trajectories, and other measurements, may be processed exclusively in volatile memory 610 and never stored persistently. Each visual frame captured by the camera system may be discarded immediately after evaluation, ensuring no visual record of the environment is maintained. This immediate discarding of visual frames involves completely removing the pixel data from memory after the necessary features have been extracted and analyzed, with no temporary caching or buffering of previous frames.

In some embodiments designed for maximum security, the system may operate without telemetry, Bluetooth, Wi-Fi, GPS, radar, ultrasonic, or infrared sensors, eliminating potential vectors for data leakage or unauthorized access. This configuration may rely exclusively on visual sensors for environmental awareness, with all processing occurring locally in the local processing unit 608 and all data being erased upon completion of each processing cycle. The system may be physically isolated from external networks or storage devices, with no capability to transmit or receive data during operation.

For navigation in these secure environments, the OI-ADAS 600 may rely exclusively on visual cues such as painted lines, markers, and parking indicators on the ground surface. The visual cue analyzer 614 may be trained to recognize and follow standard airport markings, including pushback lines, taxiway centerlines, and position indicators. This approach allows the system to navigate effectively without requiring any stored maps or location data. The visual cue analyzer 614 may identify these markings in real-time, process their meaning, and the control command generator 616 may generate appropriate movement commands without retaining any information about the specific layout or characteristics of the operating environment. As shown in FIG. 7, the method 700 includes generating control commands based on analyzed visual cues in step 708, controlling the turntable lifting unit in step 710, and maneuvering the tow vehicle to tow the aircraft in step 712.

The OI-ADAS 600 may utilize a multi-sensor approach to estimate its pose (position and orientation) with high accuracy. This approach may involve integrating data from various sensors to create a comprehensive understanding of the tow vehicle's state and movement.

Visual feedback from cameras may play a crucial role in pose estimation. The visual cue analyzer 614 may use computer vision algorithms to identify and track visual features in the environment, such as ground markings, stationary objects, or structural elements of the airport. By analyzing the relative positions and movements of these features across multiple camera frames, the system may estimate its own motion and position changes.

Figure 8A:
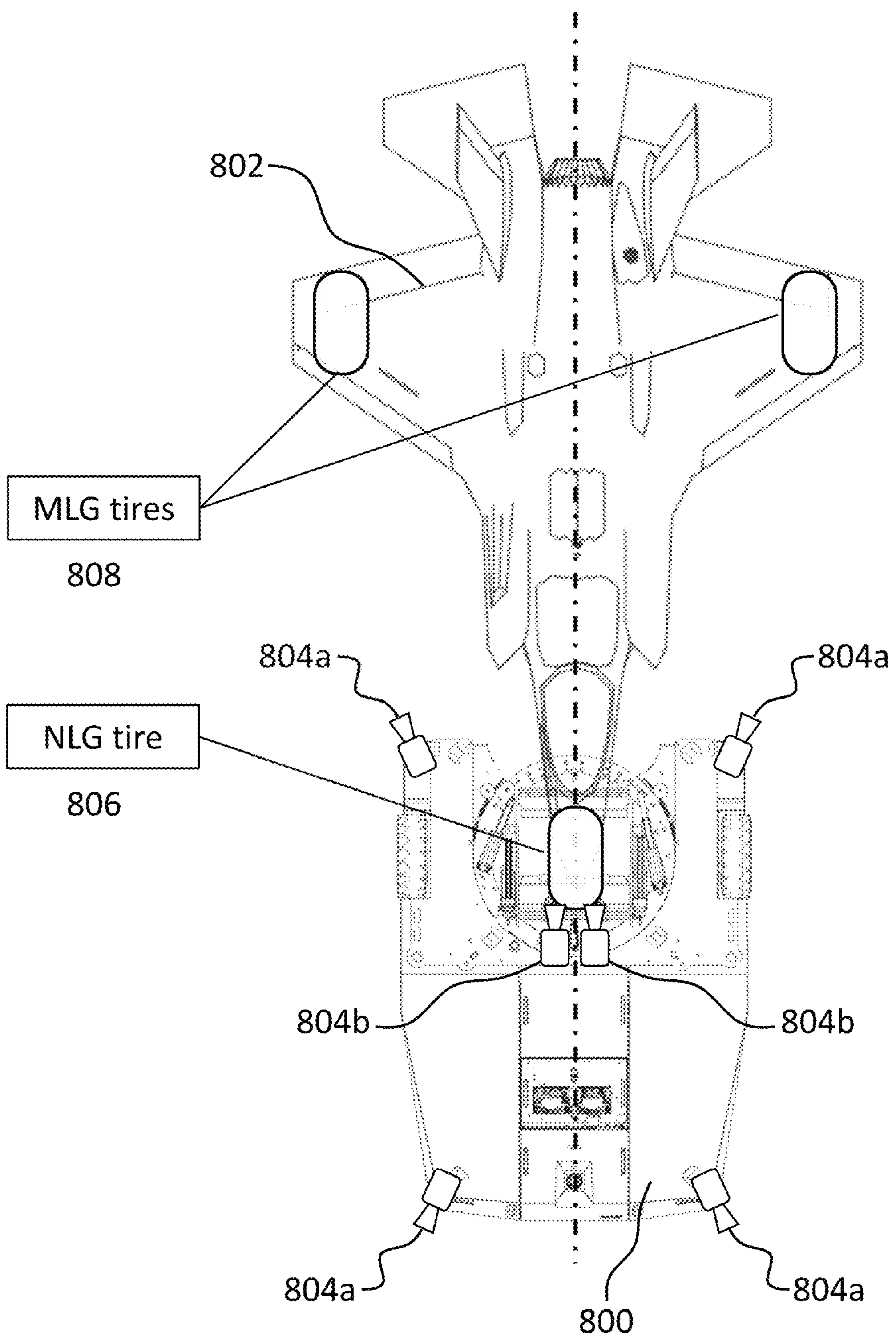
FIGS. 8A-8C illustrate schematic views of a tow vehicle and aircraft showing camera positioning and coverage areas, according to aspects of the present disclosure.
Figure 8B:
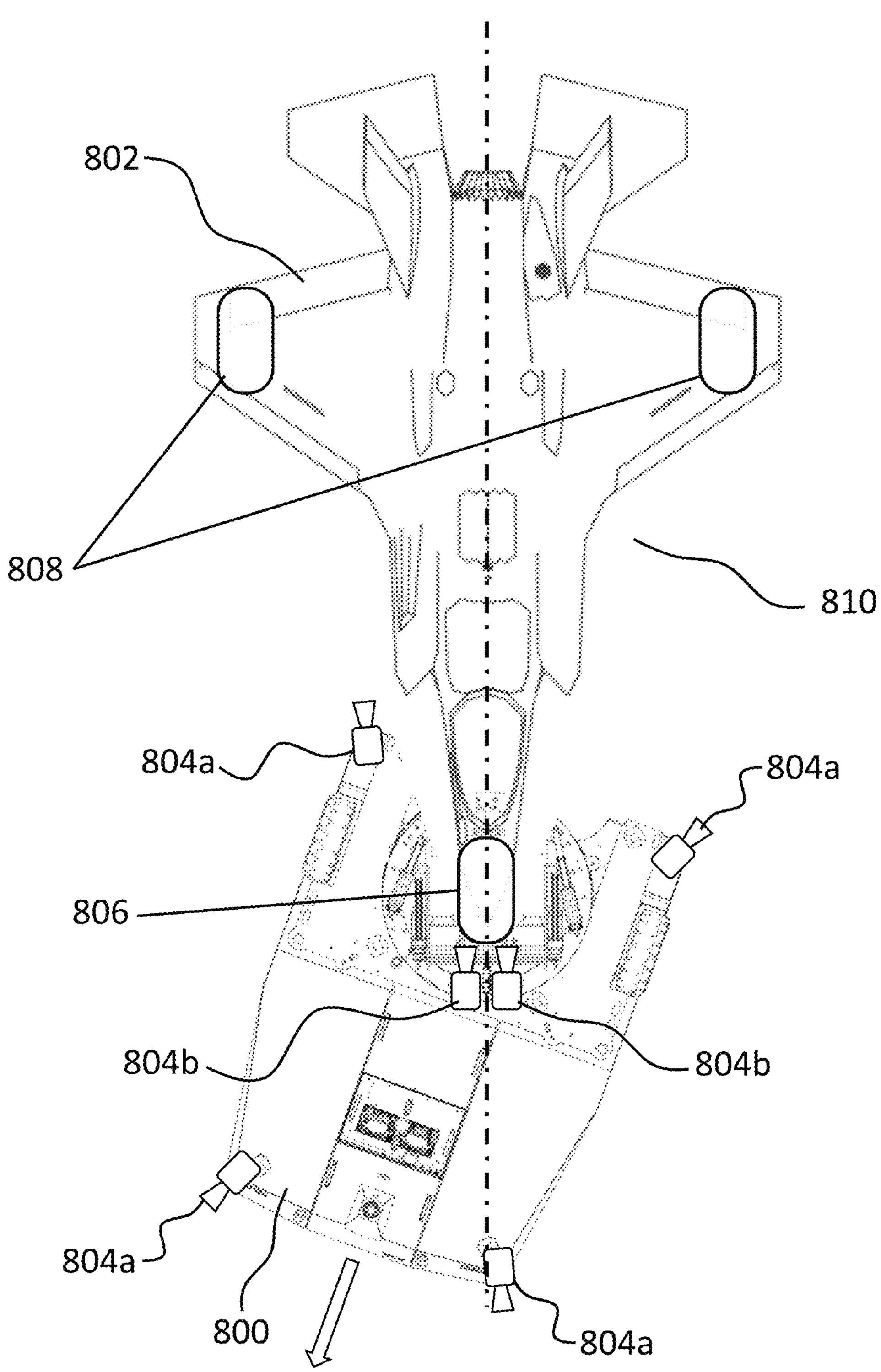
Figure 8C:
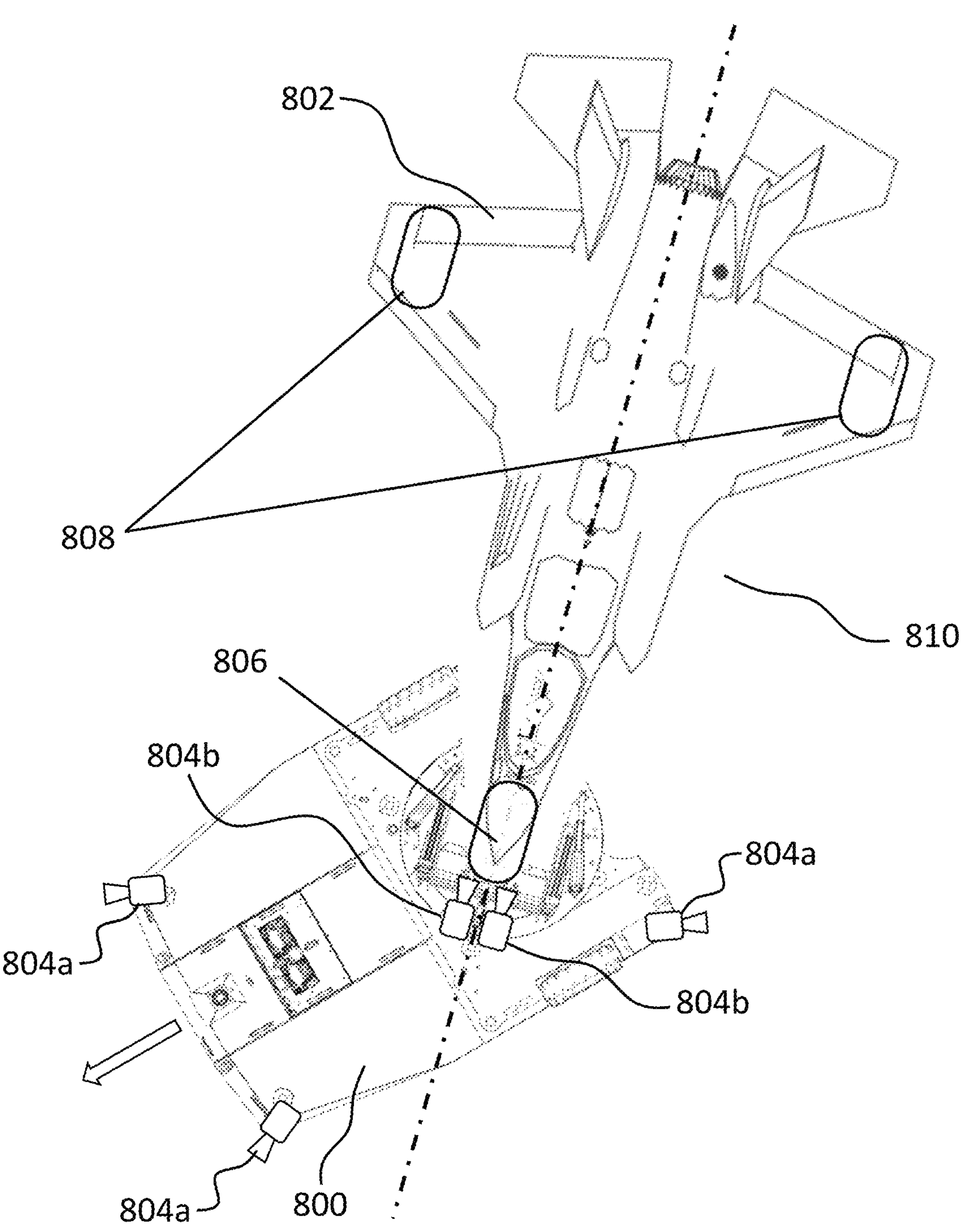
Figure 9:
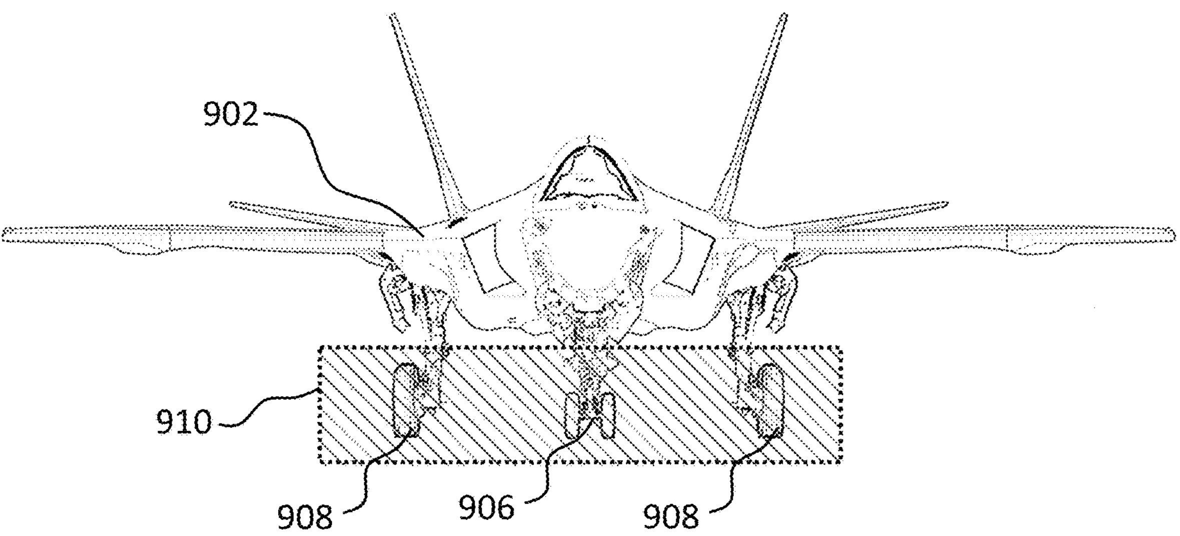
FIG. 9 illustrates a schematic view of an aircraft showing camera coverage areas during towing operations, according to aspects of the present disclosure.

In some implementations, the sensor system 606 may incorporate cameras (e.g., Gigabit Multimedia Serial Link (GMSL) cameras) to provide high-performance visual sensing capabilities. These cameras may be strategically positioned throughout the tow vehicle 602 to serve multiple sensing functions during aircraft handling operations. As illustrated in FIGS. 8A-8C, a tow vehicle 800 may be equipped with multiple cameras positioned to monitor both the ground surface and the aircraft 802, or parts thereof such as the NLG and/or MLG as illustrated in FIG. 9, during towing operations.

The cameras may be configured for ground sensing applications, where they capture and analyze tarmac markings such as pushback lines, taxiway centerlines, parking position indicators, and other ground-based visual cues. As shown in FIGS. 8A-8C, ground cameras 804*a* may be mounted around the perimeter of the tow vehicle 800 at optimal angles to provide clear visibility of surface markings while minimizing interference from shadows, reflections, or environmental conditions. These ground cameras 804*a* create a comprehensive field of view around the vehicle, indicated by the shaded region in FIGS. 8B-8C, enabling continuous monitoring of ground markings during towing operations.

For obstacle detection purposes, cameras may be positioned around the perimeter of the tow vehicle 602 to monitor the surrounding environment for potential hazards. As illustrated in FIGS. 8A-8C, the ground cameras 804*a* positioned around the tow vehicle 800 can detect static obstacles such as ground support equipment, barriers, or structures, as well as moving objects including other vehicles, personnel, or aircraft. The high-resolution imaging capabilities of GMSL cameras may enable precise identification and classification of obstacles at various distances within the camera's field of view.

The sensor system 606 may also include cameras specifically oriented toward aircraft landing gear sensing. As shown in FIGS. 8A-8C, landing gear cameras 804*b*, which may incorporate depth-sensing capabilities, may be positioned to monitor the nose landing gear tire 806 and main landing gear tires 808 during capturing, lifting, and towing operations, providing visual feedback and precise distance measurements on the positioning and condition of the landing gear components. The strategic positioning of these depth-sensing cameras ensures comprehensive visual coverage and accurate spatial awareness of critical connection points between the tow vehicle 800 and aircraft 802.

GMSL cameras in particular may offer several advantages for the OI-ADAS 600 system. The high-bandwidth serial link architecture may enable transmission of uncompressed, high-resolution video data over long cable runs without signal degradation. This capability may be particularly beneficial in the tow vehicle environment, where cameras may be distributed across the vehicle's structure, as illustrated in FIGS. 8A-8C, and connected to the central processing unit 608 through extended cable paths.

The GMSL interface may provide robust electromagnetic interference (EMI) immunity, which may be important in the airport environment where various electronic systems and radio frequency sources are present. This interference resistance may help maintain consistent image quality and data integrity during operations, ensuring reliable visual data from all cameras.

In some aspects, GMSL cameras may incorporate active alignment lenses that can be precisely adjusted to maintain optimal focus and image quality despite vibration or movement of the tow vehicle. These cameras may support high frame rates and low latency data transmission, enabling real-time processing of visual information by the visual cue analyzer 614. This rapid data processing capability may be particularly valuable for collision avoidance applications and dynamic obstacle detection, where immediate response to changing conditions may be required. As shown in FIGS. 8A-8C, the comprehensive camera coverage around the tow vehicle 800 and aircraft 802 ensures that potential obstacles or hazards can be detected from multiple angles simultaneously.

The GMSL architecture may also facilitate camera synchronization across multiple units, allowing the system to capture coordinated images from different viewpoints simultaneously. This synchronized capture capability may enhance the accuracy of pose estimation and environmental mapping by providing temporally aligned visual data from multiple perspectives. As illustrated in FIGS. 8A-8C, the ground cameras 804*a* and landing gear cameras 804*b* work together to provide a complete visual understanding of both the tow vehicle's surroundings and its interaction with the aircraft's landing gear system.

The field of view 810 provided by the camera system may extend across multiple zones around the tow vehicle 800 and aircraft 802 combination. As shown in FIG. 9, the field of view 910 beneath an aircraft 902 may encompass the area around both the nose landing gear 906 and main landing gear 908, enabling comprehensive monitoring of the aircraft's ground contact points during towing operations. This extended coverage may allow the system to maintain visual awareness of the aircraft's stability and positioning throughout various maneuvers. A benefit of focusing the field of view specifically on the landing gear areas is that it inherently limits the capture of potentially sensitive information about the aircraft's design, payload, or other classified features. By restricting visual data collection to only the landing gear and immediate surrounding ground areas necessary for safe towing operations, the system maintains operational security while still providing all required visual feedback for precise maneuvering.

In some implementations, the camera positioning may be optimized to minimize blind spots while maximizing coverage of areas where potential hazards or important visual cues may be present. The ground cameras 804*a* may be angled to capture ground markings at various distances ahead of and around the tow vehicle 800, while the landing gear cameras 804*b* may focus on the immediate vicinity of the aircraft's landing gear components to ensure proper engagement and monitoring during operations.

In some implementations, the OI-ADAS 600 may automatically adjust the automated turntable angle to ensure that the nose wheel remains parallel to the longitudinal axis of the aircraft during towing operations. This capability may be particularly valuable when the towing process is initiated at an angle, such as when the tow vehicle 800 approaches the aircraft 802 from a non-aligned position, as illustrated in FIG. 8B where the initial engagement may occur at approximately 30° relative to the aircraft's centerline.

When towing begins with the turntable positioned at an angle relative to the tow vehicle 602, the OI-ADAS 600 may continuously monitor the relative positioning between the tow vehicle 602 and aircraft through the sensor system 606. As the tow vehicle 602 begins to pull and the aircraft naturally begins to align itself with the direction of travel, the turntable control module 618 may automatically adjust the turntable angle to maintain proper nose wheel alignment. This dynamic adjustment may allow the aircraft to become aligned behind the tow vehicle 602 without requiring manual intervention from operators.

The turntable angle adjustment calculations may operate with dynamic movement parameters, taking into account the real-time motion of both the tow vehicle 602 and aircraft. The visual cue analyzer 614 may continuously process data from the landing gear cameras 804*b* to determine the current orientation of the nose landing gear relative to the aircraft's longitudinal axis. The controller 612 may then calculate the required turntable rotation to maintain parallel alignment between the nose wheel and the aircraft's centerline.

In some aspects, the speed of turntable rotation may vary dynamically based on several operational parameters. The steering angle of the tow vehicle 602 may influence the rate of turntable adjustment, with sharper turns requiring more rapid turntable rotation to maintain proper alignment. The system may also differentiate between pulling and pushing operations, adjusting the turntable rotation speed accordingly. During pulling operations, the turntable may rotate more gradually as the aircraft naturally follows the tow vehicle's path, while pushing operations may require more aggressive turntable adjustments to maintain proper alignment.

The turntable control module 618 may employ predictive algorithms to anticipate the required turntable adjustments based on the tow vehicle's intended path and current steering inputs. This predictive capability may enable smoother turntable movements and reduce the likelihood of overcorrection or oscillation during alignment processes. The absolute encoder 216 may provide precise feedback on the turntable's current position, allowing the system to make fine adjustments with high accuracy.

In some cases, the automatic turntable adjustment system may incorporate safety limits to prevent excessive rotation speeds or angles that could stress the aircraft's nose landing gear structure. The integrated torque sensors may monitor the forces applied to the landing gear during turntable adjustments, automatically reducing rotation speed or halting movement if predetermined force thresholds are exceeded. This force monitoring capability may help protect both the aircraft and tow vehicle from potential damage during dynamic alignment operations.

Motion feedback sensors may provide complementary data to enhance pose estimation accuracy. Accelerometers may measure linear acceleration in three dimensions, allowing the system to track changes in velocity and position over time. Gravitometers may provide information about the tow vehicle's orientation relative to the Earth's gravitational field, helping to determine pitch and roll angles. Gyroscopes may measure angular velocity, enabling the system to track rotational movements and changes in heading. Gyroscopes may measure angular velocity, enabling the system to track rotational movements and changes in heading. The controller 612 may fuse data from the camera and at least one of the gravitometer, accelerometer, gyroscope, or magnetometer to estimate the tow vehicle's pose.

In some implementations, the OI-ADAS 600 may incorporate a magnetometer or compass to detect the Earth's magnetic field. This sensor may provide absolute heading information, which may be particularly useful for maintaining long-term orientation accuracy.

The pose estimation information generated through this multi-sensor approach serves as a foundational input for several critical components of the OI-ADAS 600. The control command generator 616 may directly utilize pose data to calculate appropriate steering angles, speed adjustments, and turntable positions needed to maintain the desired trajectory during towing operations. By continuously comparing the current estimated pose with the intended path, the system can generate precise control commands that minimize deviation and ensure smooth movement.

The turntable control module 618 may leverage pose estimation data to optimize the positioning and operation of the turntable lifting unit 604. When capturing an aircraft's nose landing gear, accurate pose information enables precise alignment between the turntable and the landing gear. During towing operations, the module may continuously adjust the turntable's orientation based on the tow vehicle's estimated pose relative to the aircraft, helping to maintain proper alignment and minimize stress on the landing gear structure.

The collision avoidance module 620 may integrate pose estimation with obstacle detection data to create dynamic safety envelopes around the tow vehicle and aircraft. By accurately tracking the position and orientation of the combined vehicle-aircraft system, the module can precisely calculate proximity to potential obstacles and determine appropriate avoidance strategies. This integration enables the system to predict potential collision scenarios before they occur and take preventive action, such as adjusting speed or trajectory to maintain safe clearances.

The short-term path estimation module 622 may build upon pose estimation data to project the tow vehicle's future trajectory. By combining the current pose with velocity vectors and planned control inputs, the module can generate predictions about where the vehicle will be positioned in the next few seconds. These predictions enable proactive decision-making, allowing the system to anticipate challenges such as tight turns or narrow passages and adjust its approach accordingly before reaching them.

During mode transitions between autonomous and operator-controlled operation, pose estimation data may provide continuity and safety. As the system transfers control, accurate knowledge of the current position and orientation ensures that there are no sudden corrections or movements that could stress the aircraft structure or create unsafe conditions. The pose information may also be used to provide visual feedback to operators, helping them understand the current state of the system and make appropriate control inputs during manual operation.

Force feedback from the turntable unit may offer additional insights into the tow vehicle's interaction with the aircraft. By measuring forces and torques at the interface between the turntable and the aircraft's nose landing gear, the system may infer information about the vehicle's movement and orientation relative to the aircraft.

To integrate these diverse sensor inputs and produce a robust pose estimate, the OI-ADAS 600 may employ Kalman filtering techniques. Kalman filters may be particularly well-suited for this application due to their ability to combine noisy measurements from multiple sources and produce optimal state estimates.

The OI-ADAS 600 may incorporate integrated torque sensors at the turntable lifting unit 604 and drive system to provide force and motion feedback. These sensors may detect resistance or unexpected forces during operation independently of visual sensor data, which may indicate potential collisions or obstacles. When abnormal forces are detected, the system may immediately adjust its operation parameters or initiate emergency stopping procedures to prevent damage to the aircraft or surrounding equipment and maintain stability of the tow vehicle and aircraft. This mechanical feedback mechanism provides an additional layer of collision avoidance that functions independently of visual sensors, enhancing safety in low-visibility conditions or when visual sensors may be limited.

The integrated torque sensors may also monitor forces applied to the aircraft's nose landing gear during lifting and towing operations and detect abnormal force patterns indicating potential mechanical stress or misalignment. The system may generate autonomous responses by automatically reducing applied forces or halting operations when force thresholds are exceeded to prevent damage to the aircraft or tow vehicle.

The OI-ADAS 600 may utilize advanced model training techniques leveraging digital simulation and high-fidelity digital twins of the towing vehicle and aircraft. These digital twins may provide a virtual environment for generating extensive training data without the need for physical prototypes or real-world testing.

In some implementations, the digital twins may simulate sensor data from multiple sources, including visual sensors, inertial measurement units, and force feedback systems. The simulated sensor outputs may closely mimic the characteristics of real sensors, including noise, drift, and other imperfections. This approach may allow the system to learn robust perception and decision-making strategies that can generalize to real-world conditions.

The digital twins may also model the complex dynamics of both the towing vehicle and aircraft. This may include accurate representations of mass distribution, inertia, friction, and aerodynamic effects. By simulating these physical properties, the system may learn to anticipate and compensate for the unique challenges of maneuvering large aircraft in confined spaces.

Control inputs for the simulated towing vehicle may be generated through a combination of programmed scenarios and reinforcement learning algorithms. These algorithms may explore a wide range of possible actions and learn optimal strategies for different situations. The digital environment may allow for rapid iteration and testing of control policies without the risk or expense associated with physical trials.

Environmental constraints, such as airport layout, weather conditions, and operational rules, may be incorporated into the digital simulations. This may enable the system to learn context-aware behaviors and adapt to varying operational conditions. The simulations may include rare or hazardous scenarios that would be difficult or dangerous to replicate in real-world training.

The training data generated through these simulations may encompass both synthetic visual inputs and emulated mechatronic feedback. Visual data may include simulated camera feeds representing various lighting conditions, weather effects, and airport configurations. Mechatronic feedback may simulate the forces and torques experienced by the towing vehicle during different maneuvers and aircraft interactions.

The final trained models may be deployed on offline systems with no external connectivity, ensuring the security and independence of the autonomous towing system. These models may encapsulate the learned behaviors and decision-making processes without requiring access to external data sources or cloud-based computing resources.

The use of digital simulation and high-fidelity digital twins for model training may offer several potential advantages. It may allow for extensive testing and refinement of the autonomous system's capabilities without the need for costly and time-consuming physical trials. The approach may also enable the exploration of a wider range of scenarios and edge cases than would be practical with real-world testing alone, potentially resulting in more robust and adaptable systems.

The OI-ADAS 600 may incorporate hybrid operational capabilities, allowing for seamless transitions between operator-guided control and autonomous control. This flexibility may enhance the system's adaptability to various operational scenarios and provide an additional layer of safety and oversight. The system may automatically transition between fully autonomous and operator-controlled modes based on detected intervention conditions while maintaining safety constraints throughout the transition. Transitions from autonomous to operator-controlled mode may be triggered by operator input through the control interface, detection of complex environmental conditions requiring human judgment, or system uncertainty about the optimal path forward. When transitioning to operator control, the system may gradually transfer authority while providing haptic feedback and visual guidance to ensure smooth handover. Conversely, transitions from operator-controlled to autonomous mode may occur when the operator releases controls, when the system detects routine operations that can be safely automated, or when the operator explicitly activates autonomous mode through the interface. In both transition directions, the OI-ADAS 600 may maintain a continuous safety envelope, temporarily operating in a hybrid state where both systems influence control decisions to prevent abrupt changes that could affect aircraft stability or positioning accuracy.

In some implementations, the system may feature a short-term path estimation module 622. This module may continuously predict the tow vehicle's trajectory (e.g., for the next few seconds) based on current sensor data, control inputs, and/or environmental conditions without storing historical path information. The short-term path estimation may operate exclusively in volatile memory, analyzing only the most recent sensor frames to project potential vehicle positions and orientations over a limited time horizon. Unlike traditional path planning systems that build and maintain environmental maps, this module generates ephemeral trajectory predictions that exist only momentarily during processing and are immediately discarded after use. The module may employ geometric primitives and relative spatial relationships rather than absolute positioning, allowing it to function effectively without retaining or referencing persistent environmental data. This approach enables the system to maintain situational awareness while preserving operational security in sensitive environments. The short-term path estimation may serve as a basis for both autonomous decision-making and operator guidance, as illustrated in FIG. 7 where the method 700 includes checking for obstacles in step 714 and generating avoidance maneuvers in step 716 if obstacles are detected. When obstacles are detected, the module rapidly may recalculate potential trajectories within the same processing cycle, ensuring that no record of the obstacle's specific characteristics or location persists beyond the immediate need for avoidance.

The operator interface may include a display showing the estimated short-term path overlaid on a real-time view of the environment. This visualization may help operators anticipate the system's actions and intervene if necessary. The interface may also provide haptic feedback through the control inputs, subtly guiding the operator towards optimal paths or alerting them to potential hazards.

Intervention conditions may be defined to allow smooth transitions between autonomous and operator-guided control. For example, the system may detect when an operator applies force to the controls, interpreting this as an intention to intervene. Upon detecting intervention, the system may gradually transfer control to the operator while maintaining safety constraints. The system may monitor operator inputs during operator-controlled mode and detect intervention conditions including operator force applied to controls, excessive deviation from planned paths, and detection of imminent collision risks.

Halt conditions may be implemented to ensure safe operation in both autonomous and operator-guided modes. These conditions may include detection of unexpected obstacles, excessive forces on the turntable unit, or deviations from the planned path beyond a certain threshold. When a halt condition is triggered, the system may initiate a controlled stop and alert the operator.

The operator interface may also include customizable autonomy levels, allowing operators to adjust the balance between manual control and autonomous operation. This may range from fully manual control with system-provided guidance to fully autonomous operation with operator oversight.

The OI-ADAS 600 may employ security-conscious mapping and trajectory planning techniques to ensure safe and efficient operation while maintaining data privacy and security. In some implementations, the system may utilize a dynamic, ephemeral mapping approach that avoids storing persistent environmental data.

The mapping process may involve real-time analysis of visual inputs from the tow vehicle's camera systems. As the vehicle moves through the environment, the OI-ADAS 600 may construct a temporary, abstract representation of the surroundings using geometric primitives and relative spatial relationships. This representation may focus on identifying key features such as edges, corners, and open spaces, rather than capturing detailed structural information.

In some aspects, the system may employ a localization and mapping algorithm that operates solely in volatile memory 610. This approach may allow the tow vehicle 602 to build and update a map of its immediate surroundings while simultaneously determining its own position within that map. The mapping process may be designed to discard older map data as the vehicle moves, maintaining only the information necessary for current navigation tasks.

Trajectory planning within this security-conscious framework may rely on real-time path generation algorithms. These algorithms may consider the current position of the tow vehicle 602, the desired destination, and the abstract environmental representation to compute optimal paths. As shown in FIG. 7, the method 700 includes continuing the towing operation in step 718 after checking for obstacles and generating avoidance maneuvers if necessary.

To enhance security, the trajectory planning system may avoid storing or transmitting complete path information. Instead, it may generate and execute movement commands in small increments, with each step being computed based on the current state and immediate sensor data. This approach may minimize the risk of unauthorized access to sensitive operational information.

The security-conscious mapping and trajectory planning techniques employed by the OI-ADAS 600 may enable the tow vehicle 602 to navigate complex airport environments effectively while maintaining a high level of data security and privacy. By focusing on real-time processing and avoiding persistent storage of environmental data, the system may minimize potential vulnerabilities while still providing robust navigation capabilities. The OI-ADAS 600 and its associated systems and methods may enhance the reliability and adaptability of the autonomous aircraft capturing and lifting system, allowing it to operate effectively in a wide range of environments and situations without relying on constant network connectivity or external computational resources. The system's ability to function in secure, network-denied environments while maintaining strict data security protocols makes it particularly suitable for sensitive military applications or operations involving classified aircraft.

In some aspects, the methods and systems presented herein may be embodied in hardware, software, firmware, or a combination thereof. The hardware components of the system may include one or more processors, memory devices, storage units, input/output interfaces, and network communication modules. The software and firmware may include non-transitory machine executable code stored on a computer-readable medium. The non-transitory machine executable code may include various modules corresponding to different system components. These modules may communicate through well-defined APIs, allowing for modular development and easier maintenance. The non-transitory machine executable code may be written in any suitable programming language and may be stored on various types of non-transitory computer-readable media, such as magnetic disks, optical disks, solid-state drives, or other storage devices. The code may be compiled, interpreted, or executed by one or more processors to implement the functionalities of the document review and approval system.

In some cases, the system may be implemented using a client-server architecture, where the user interface components run on client devices (e.g., the control unit) while the AI engine and other processing components operate on one or more servers. Alternatively, the entire system may be implemented as a standalone application running on a single device. In some implementations, the system may be deployed in a cloud computing environment, allowing for scalability and distributed processing. The various components of the system may be implemented as microservices, each running in its own container and communicating with other components through well-defined APIs.

The user interfaces may be implemented using various web technologies, such as HTML, CSS, and JavaScript, allowing for cross-platform compatibility and accessibility through web browsers. Native desktop and/or mobile applications may also be developed to provide access to the system on personal computers, smartphones, and tablets.

The AI/ML components may be implemented using machine learning frameworks and libraries, which may be regularly updated to incorporate the latest advancements in natural language processing and system automation techniques. The system may also include mechanisms for continuous learning and improvement based on user feedback, interaction data, and sensor data.

The use of the term "exemplary" in this disclosure may refer to "example" or "illustrative" and may not imply any preference or requirement. The use of the singular form of any word may include the plural and vice versa. Words importing a particular gender may include every other gender. The use of "or" may not be exclusive and may include "and/or" unless the context clearly dictates otherwise. The phrases "in one embodiment," "in some embodiments," "in various embodiments," "in other embodiments," and the like may all refer to one or more of the same or different embodiments. The term "based on" may mean "based at least in part on." The term "may" may be used to describe optional features or functions. Any dimensions, measurements, or quantities given may be approximate and may vary within normal operational ranges. The use of relative terms such as "above," "below," "upper," "lower," "horizontal," "vertical," "top," "bottom," "side," "left," and "right" may be used to describe the relationship of one element to another and may not imply any particular orientation or direction unless specifically stated. The use of "including," "comprising," "having," and variations thereof may mean "including, but not limited to" unless otherwise specified. Any sequence of steps or operations described may be varied or performed in a different order unless otherwise specified. Any numerical range recited may include all values from the lower value to the upper value and all possible sub-ranges in between. The term "about" or "approximately" may mean within an acceptable error range for the particular value as determined by one of ordinary skill in the art, which may depend in part on how the value is measured or determined.

A number of implementations have been described. Nevertheless, it will be understood that various modifications may be made without departing from the spirit and scope of the disclosure. Accordingly, other implementations are within the scope of the following claims.

The invention claimed is:

1. A system for autonomous aircraft towing, comprising:

a tow vehicle including a turntable lifting unit configured to engage with an aircraft's nose landing gear;

a sensor system mounted on the tow vehicle, the sensor system including at least one camera and configured to generate sensor data; and an Offline Intelligence Advanced Driver Assistance System (OI-ADAS) integrated with the tow vehicle, the OI-ADAS including:

a local processing unit configured to process the sensor data in volatile memory without persistent storage;

a collision avoidance module configured to detect obstacles in the tow vehicle's path using the sensor system; and a controller configured to:

analyze visual cues from the camera to determine the tow vehicle's position and orientation;

generate control commands for the tow vehicle based on the analyzed visual cues;

control the turntable lifting unit to capture and lift the aircraft's nose landing gear;

monitor operator inputs during an operator-controlled mode;

detect one or more intervention conditions;

automatically transition between a fully autonomous mode and the operator-controlled mode based on the detected one or more intervention conditions while maintaining safety constraints throughout the transition; and maneuver the tow vehicle to tow the aircraft based on the generated control commands.

2. The system of claim 1, wherein the OI-ADAS is configured to operate with no preexisting maps, location data, or environment-specific information, wherein the local processing unit processes all sensed data exclusively in volatile memory, and wherein visual frames captured by the camera are discarded immediately after processing.

3. The system of claim 1, wherein the controller is further configured to:

detect visual cues on a ground surface; and navigate the tow vehicle based on the detected visual cues without relying on pre-existing maps or GPS data.

4. The system of claim 3, wherein the visual cues include at least one of pushback lines, taxiway centerlines, or parking position indicators.

5. The system of claim 1, wherein the collision avoidance module is further configured to:

generate avoidance maneuvers in the fully autonomous mode by automatically adjusting the tow vehicle's trajectory to maintain safe distances from detected obstacles; and provide collision warnings and automatic intervention in the operator-controlled mode when potential collision risks are detected.

6. The system of claim 5, wherein the one or more intervention conditions include one or more of operator force applied to controls, excessive deviation from planned paths, and detection of imminent collision risks.

7. The system of claim 1, wherein the OI-ADAS further comprises integrated torque sensors at the turntable lifting unit and drive system configured to:

detect force feedback indicating resistance or unexpected forces during operation independently of visual sensor data; and automatically initiate corrective responses including adjusting operation parameters or initiating emergency stopping procedures to maintain stability of the tow vehicle and aircraft.

8. The system of claim 7, wherein the integrated torque sensors are further configured to:

monitor forces applied to the aircraft's nose landing gear during lifting and towing operations;

detect abnormal force patterns indicating potential mechanical stress or misalignment; and trigger the controller to generate autonomous responses by automatically reducing applied forces or halting operations when force thresholds are exceeded to prevent damage to the aircraft or tow vehicle.

9. The system of claim 1, wherein the OI-ADAS further comprises:

a short-term path estimation module configured to predict the tow vehicle's trajectory based on current sensor data and control inputs.

10. The system of claim 1, wherein the sensor system further includes at least one of a gravitometer, an accelerometer, a gyroscope, and a magnetometer, and wherein the controller is further configured to fuse data from the camera and at least one of the gravitometer, accelerometer, gyroscope, or magnetometer to estimate the tow vehicle's pose.

11. A method for autonomous aircraft towing, comprising:

engaging an aircraft's nose landing gear with a turntable lifting unit of a tow vehicle;

capturing sensor data from a sensor system mounted on the tow vehicle, the sensor system including at least one camera;

processing the sensor data in volatile memory without persistent storage using a local processing unit of an Offline Intelligence Advanced Driver Assistance System (OI-ADAS) integrated with the tow vehicle;

analyzing visual cues from the camera to determine the tow vehicle's position and orientation;

generating control commands for the tow vehicle based on the analyzed visual cues;

controlling the turntable lifting unit to capture and lift the aircraft's nose landing gear;

detecting obstacles in the tow vehicle's path using;

monitoring operator inputs during an operator-controlled mode;

detecting one or more intervention conditions;

automatically transitioning between a fully autonomous mode and the operator-controlled mode based on the detected one or more intervention conditions while maintaining safety constraints throughout the transition; and maneuvering the tow vehicle to tow the aircraft based on the generated control commands.

12. The method of claim 11, wherein the OI-ADAS operates with no pre-existing maps, location data, or environment-specific information, wherein processing the sensor data comprises processing all sensed data exclusively in volatile memory, and wherein the method further comprises discarding visual frames captured by the camera immediately after processing.

13. The method of claim 11, further comprising:

detecting visual cues on a ground surface; and navigating the tow vehicle based on the detected visual cues without relying on pre-existing maps or GPS data.

14. The method of claim 13, wherein the visual cues include at least one of pushback lines, taxiway centerlines, or parking position indicators.

15. The method of claim 11, further comprising:

generating avoidance maneuvers in the fully autonomous mode by automatically adjusting the tow vehicle's trajectory to maintain safe distances from detected obstacles; and providing collision warnings and automatic intervention in the operator-controlled mode when potential collision risks are detected.

16. The method of claim 15, wherein the one or more intervention conditions include one or more of operator force applied to controls, excessive deviation from planned paths, and detection of imminent collision risks.

17. The method of claim 11, further comprising:

detecting force feedback indicating resistance or unexpected forces during operation independently of visual sensor data using integrated torque sensors at the turntable lifting unit and drive system; and automatically initiating corrective responses including adjusting operation parameters or initiating emergency stopping procedures to maintain stability of the tow vehicle and aircraft.

18. The method of claim 17, further comprising:

monitoring forces applied to the aircraft's nose landing gear during lifting and towing operations;

detecting abnormal force patterns indicating potential mechanical stress or misalignment; and triggering the controller to generate autonomous responses by automatically reducing applied forces or halting operations when force thresholds are exceeded to prevent damage to the aircraft or tow vehicle.

19. The method of claim 11, further comprising:

predicting the tow vehicle's trajectory based on current sensor data and control inputs using a short-term path estimation module.

20. The method of claim 11, wherein the sensor system further includes at least one of a gravitometer, an accelerometer, a gyroscope, and a magnetometer, and wherein the method further comprises fusing data from the camera and at least one of the accelerometer, gyroscope, or magnetometer to estimate the tow vehicle's pose.

* * * * *